United States Patent [19]

Derchak

[11] 4,067,059
[45] Jan. 3, 1978

[54] SHARED DIRECT MEMORY ACCESS CONTROLLER

[75] Inventor: Nicholas Derchak, Hatfield, Pa.

[73] Assignee: Sperry Rand Corporation, New York, N.Y.

[21] Appl. No.: 653,408

[22] Filed: Jan. 29, 1976

[51] Int. Cl.² ............................................. G06F 13/00
[52] U.S. Cl. ................................................... 364/200
[58] Field of Search .................... 340/172.5; 445/1; 364/200, 900

[56] References Cited

U.S. PATENT DOCUMENTS

| | | | |
|---|---|---|---|
| 3,675,209 | 7/1972 | Trost et al. | 340/172.5 |
| 3,760,324 | 1/1973 | Cohen et al. | 340/172.5 |
| 3,771,134 | 11/1973 | Huettner et al. | 340/172.5 |
| 3,820,079 | 6/1974 | Bergh et al. | 340/172.5 |
| 3,828,325 | 8/1974 | Stafford et al. | 340/172.5 |
| 3,833,930 | 9/1974 | Macker | 340/172.5 |
| 3,909,790 | 9/1975 | Shapiro et al. | 340/172.5 |
| 3,916,139 | 12/1968 | Marx | 340/172.5 |

Primary Examiner—Mark E. Nusbaum
Attorney, Agent, or Firm—B. Franklin Griffin, Jr.; E. T. Battjer; Sheldon Kapustin

[57] ABSTRACT

A microprocessor system includes a microprocessor, a memory, and one or more direct memory access controllers, all connected to a common system bus which includes a system address bus and a system data bus. At least one of the direct memory access controllers is shared by a plurality of subsystem device controllers which may control peripheral devices having diverse characteristics. The microprocessor is limited in its instruction repertoire and may control peripheral devices only by means of an input and an output instruction. The shared direct memory access controller includes no circuitry which is specifically for controlling only a single type of peripheral device, the device dependent logic being located in subsystem device controllers. Data transfers may take place directly between the memory and, through the shared direct memory access controller, any selected one of the peripheral devices. In order to set up the actual data transfer, the microprocessor executes an Input instruction which addresses the status register in a selected subsystem device controller and returns this status to the microprocessor. Next, two Output instructions are executed to load a memory starting address into an address pointer counter in the shared direct memory access controller. Finally, an Output instruction is executed to address a control register in the selected subsystem device controller to load it with a command. After this last operation the actual data transfer takes place on a byte basis through the shared direct memory access controller between the memory and the selected subsystem device controller. The shared direct memory access controller includes an interrupt priority encoder and circuits responsive to an interrupt that is granted priority for placing the status and address of the interrupting subsystem device controller on the system bus. Circuits are included in the shared direct memory access controller for "handshaking" between it and the memory, and between it and the subsystem device controllers.

15 Claims, 19 Drawing Figures

INPUT

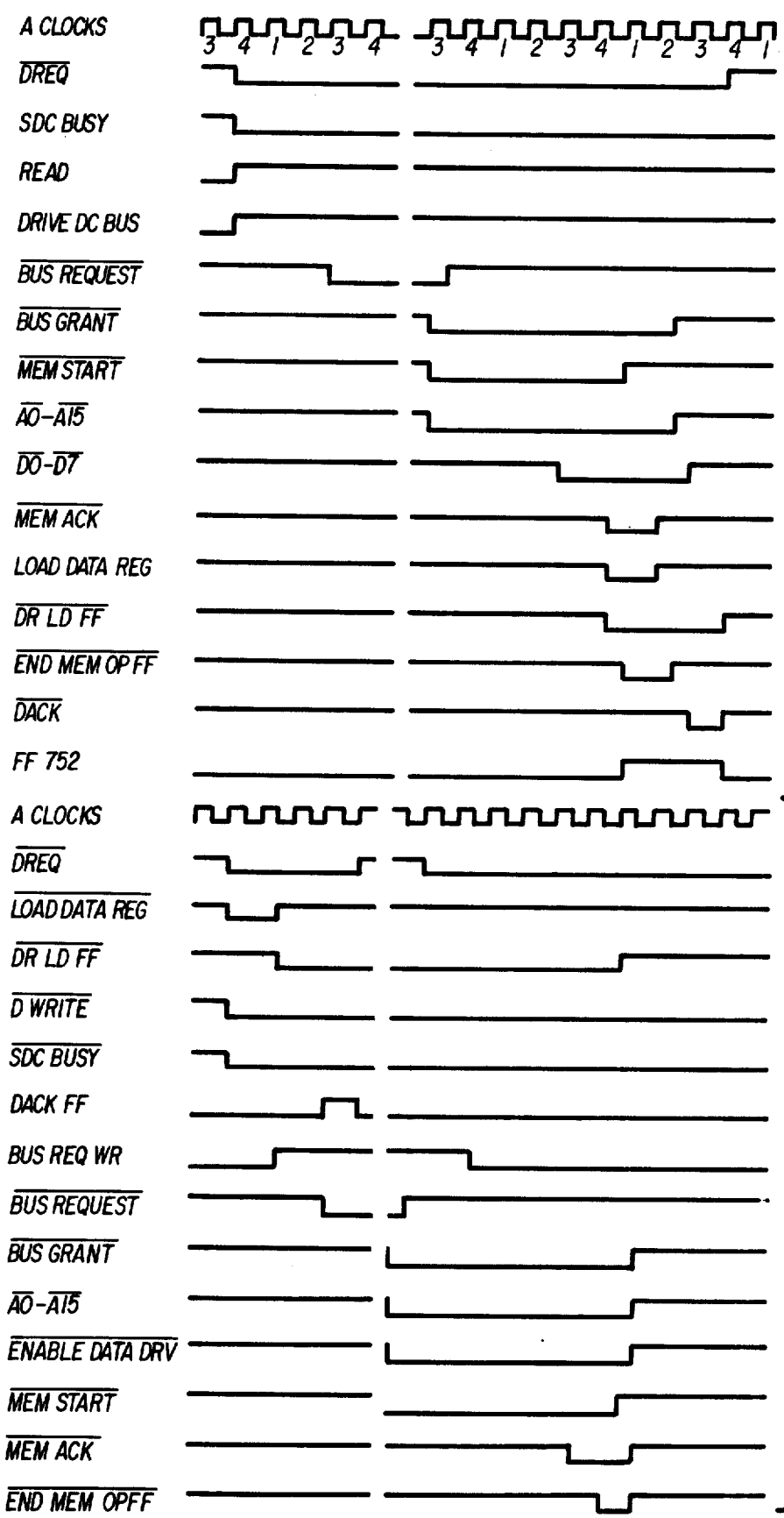
FIG. 12A DATA TRANSFER – READ
FIG. 12B DATA-TRANSFER-WRITE

SHARED DIRECT MEMORY ACCESS CONTROLLER

BACKGROUND OF THE INVENTION

The present invention relates to a data processing system employing a shared direct memory access controller for connecting a plurality of subsystem device controllers to a memory under the control of a microcomputer which serves as the central processing unit of the system. Microprocessors are a fairly recent development and are receiving wide attention in the data processing art. See for example Fortune Magazine, November, 1975. While microcomputers are of extremely small size, can be extremely fast in operation, and are relatively inexpensive compared to prior art computers, they sometimes have undesirable limitations. For example, the Intel 8080 microcomputer has only two instructions for communicating with external devices. One of these is for controlling input operations and the other is for controlling output operations. This characteristic places severe limitations on the use of this particular microcomputer in a system employing a number of peripheral devices of diverse characteristics, particularly where it is desired to provide direct memory access whereby the peripheral devices may communicate with the memory at the same time the microcomputer is engaged in other operations.

The concept of direct memory access is well known in the art. Generally speaking, this concept allows a central processing unit to load a subsystem device controller with the instructions and data necessary to initiate and carry out a data transfer between the memory and the peripheral device connected to and controlled by the subsystem device controller. Once the subsystem controller has been set up, the central processing unit is then free to carry out other operations in the system while the subsystem device controller itself controls the transfers between memory and the peripheral device.

In the prior art, it has been customary to provide each subsystem device controller with all of the circuits necessary for carrying out the data transfers between its peripheral device and the memory. Furthermore, each of the subsystem device controllers has been directly connected to a system bus to which the memory and central processing unit are also connected. There are some functions which must be performed by each of the subsystem device controllers regardless of the type of the peripheral device they serve hence the presently utilized arrangement requires an unnecessary duplication of circuitry in each of the subsystem device controllers in order to carry out these functions.

SUMMARY OF THE INVENTION

An object of the present invention is to provide a direct memory access controller which is shared by a plurality of subsystem device controllers for the purpose of transferring data between the memory and a peripheral device through the direct memory access controller and the subsystem device controller.

An object of the present invention is to provide a direct memory access controller responsive only to an input signal or an output signal from a microcomputer for setting up and controlling the transfer of data from a memory to a subsystem device controller.

A further object of the invention is to provide a direct memory access controller for managing the operations of several subsystem device controllers and having no means therein whose function is dependent upon the type of peripheral units connected to the subsystem device controllers.

An object of the present invention is to provide in a data processing system having a common address bus and a common data bus for communicating between a central processor, a memory, and a plurality of peripheral devices, the improvement comprising a plurality of addressable direct memory access units each controlling the direct transfer of data between at least one of the peripheral devices and the memory, at least one of the direct memory access units being a shared direct memory access unit, the peripheral devices controlled by said shared direct memory access unit having diverse characteristics.

A further object of the invention is to provide an improved data processing system as described in the preceding paragraph and further including an addressable subsytem device controller connected between the shared direct memory access controller and each peripheral device controlled by the shared direct memory access controller, the subsystem device controllers being connected to said shared direct memory access controller by a common subsystem bus; an address recognition means in the shared direct memory access controller for recognizing some of the address bits on the common address bus as the address of the shared direct memory access controller; a gating means responsive to the address recognition means and an input instruction from the microprocessor for gating address bits on the common address bus onto the common subsystem bus as the address of a status register in a selected one of the subsystem device controllers, the selected subsystem device controller returning the value in its status register to the shared direct memory access controller over the common subsystem bus; and, a register in the shared direct memory access controller for receiving and storing the value.

Another object of the invention is to provide an improved data processing system as described above and further including a counter in the shared direct memory access controller; selection means responsive to the address recognition means and an output instruction from the microprocessor for loading a value on the common data bus into the counter; and, gating means connecting the counter to the common address bus so that the contents of the counter may directly address the memory.

Another object of the invention is to provide an improved data processing system as described above and further including means responsive to the address recognition means and other bits of an address on the common address bus for transferring data on the common data bus to a command register in the selected subsystem device controller.

Other objects of the invention and its mode of operation will become apparent on consideration of the following description and the accompanying drawings.

DETAILED DESCRIPTION OF THE INVENTION

Figure 1:
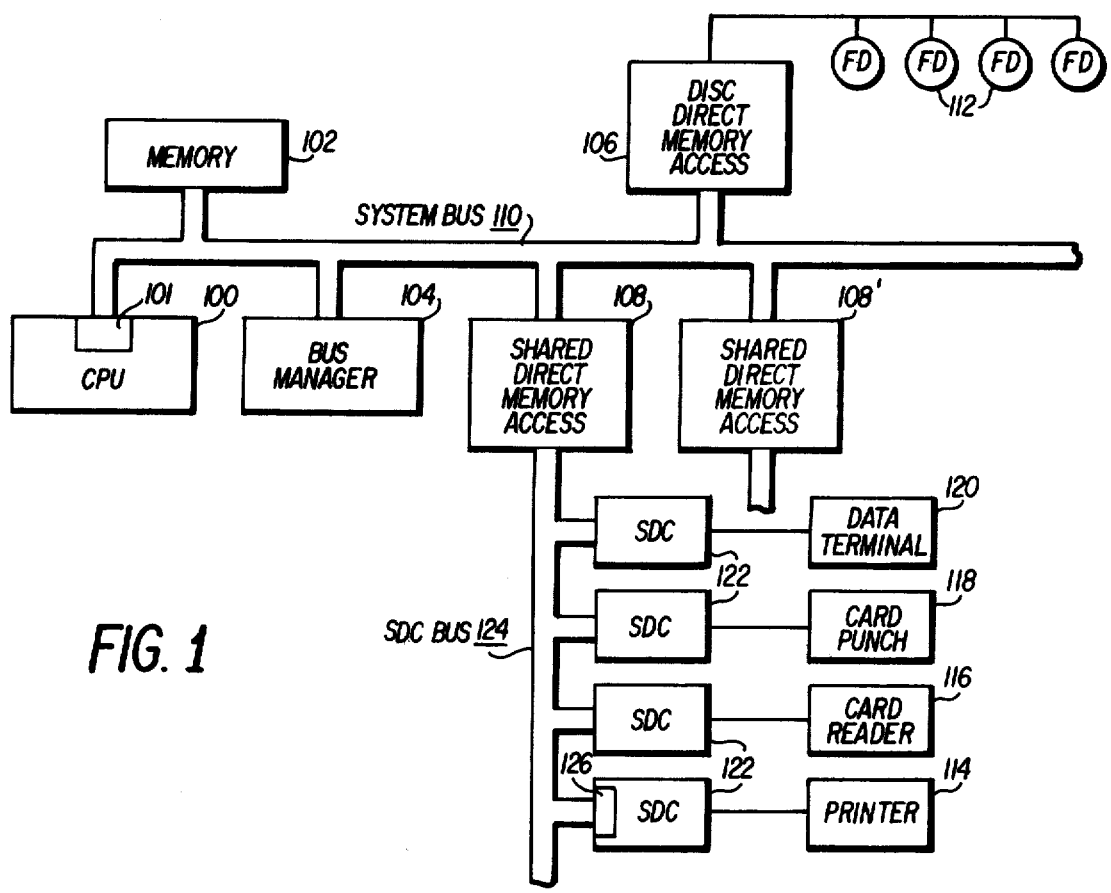
FIG. 1 is a block diagram of a data processing system employing a shared direct memory access controller.

In the subsequent description, the following conventions are employed. Each element is given a 3-digit reference numeral. The first of these digits represents the number of the figure where the element will be found. With respect to input and output leads, the first digit specifies the figure where the source of the lead will be found. Because of the particular logic elements employed, a high or positive voltage level represents the logic one state while a low or ground level represents the logic zero.

FIG. 1 shows a block diagram of a data processing system incorporating the features of the present invention. The data processing system includes a central processing unit (CPU) 100, a main storage or memory 102, a bus manager means 104, one or more disc direct memory access controllers 106 and one or more shared direct memory access controllers (SDMA) 108, all connected to a common system bus 110. CPU 100 is a microcomputer such as, for example, the Model 8080 described in the publication "The 8080 Microcomputer Users Manual" published by the Intel Corporation. CPU 100 contains the usual circuits, including an accumulator register 101, necessary for arithmetic computations and logical decision making for the data processing system.

Memory 102 is of conventional design and may, for example, comprise a model TMS 4060 storage unit such as that described in "The Semiconductor Memory Data Book For Design Engineers" published by Texas Instruments.

Since all signal transfers between the various elements connected to system bus 110 are made by way of the system bus, the bus manager 104 is provided for controlling access of the various elements to the system bus. The use of a common system bus and a bus manager is well known in the art, hence the details of the bus manager are not disclosed herein.

The direct memory access controller 106 may be a conventional direct memory access controller for connecting one of a plurality of floppy disc units 112 to the memory 102 by way of the system bus 110.

The present invention is directed toward a conventional data processing system as described above in combination with the shared direct memory access controller (SDMA) 108. SDMA 108 is provided to control the direct transfer of data between a plurality of subsystem devices and the memory 102. As illustrated in FIG. 1, the subsystem devices may comprise one or more card readers 116, one or more printers 114, one or more card punches 118, and/or one or more data terminals 120 having a keyboard input with a cathode ray tube display. Each subsystem device has associated with it a subsystem device controller (SDC) 122 and all of the SDC's 122 are connected to SDMA 108 by way of a subsystem device controller bus 124. It will be understood that the SDC's 122 may vary in their construction depending upon the type of subsystem device they are controlling. Such subsystem device controllers are well known in the art, hence their details are not disclosed herein. It might be noted, however, that in the prior art each of the SDC's 122 has been provided with its own circuit for performing certain functions such as memory addressing. As will become evident from the following description, the present invention eliminates this undue multiplication of circuitry by providing a single circuit within SDMA 108 for performing this function for all SDC's. Except for this, and the provision of the SDMA 108, all of the elements of FIG. 1 may be of conventional design and are commercially available, hence their details are not disclosed herein.

Figure 2:
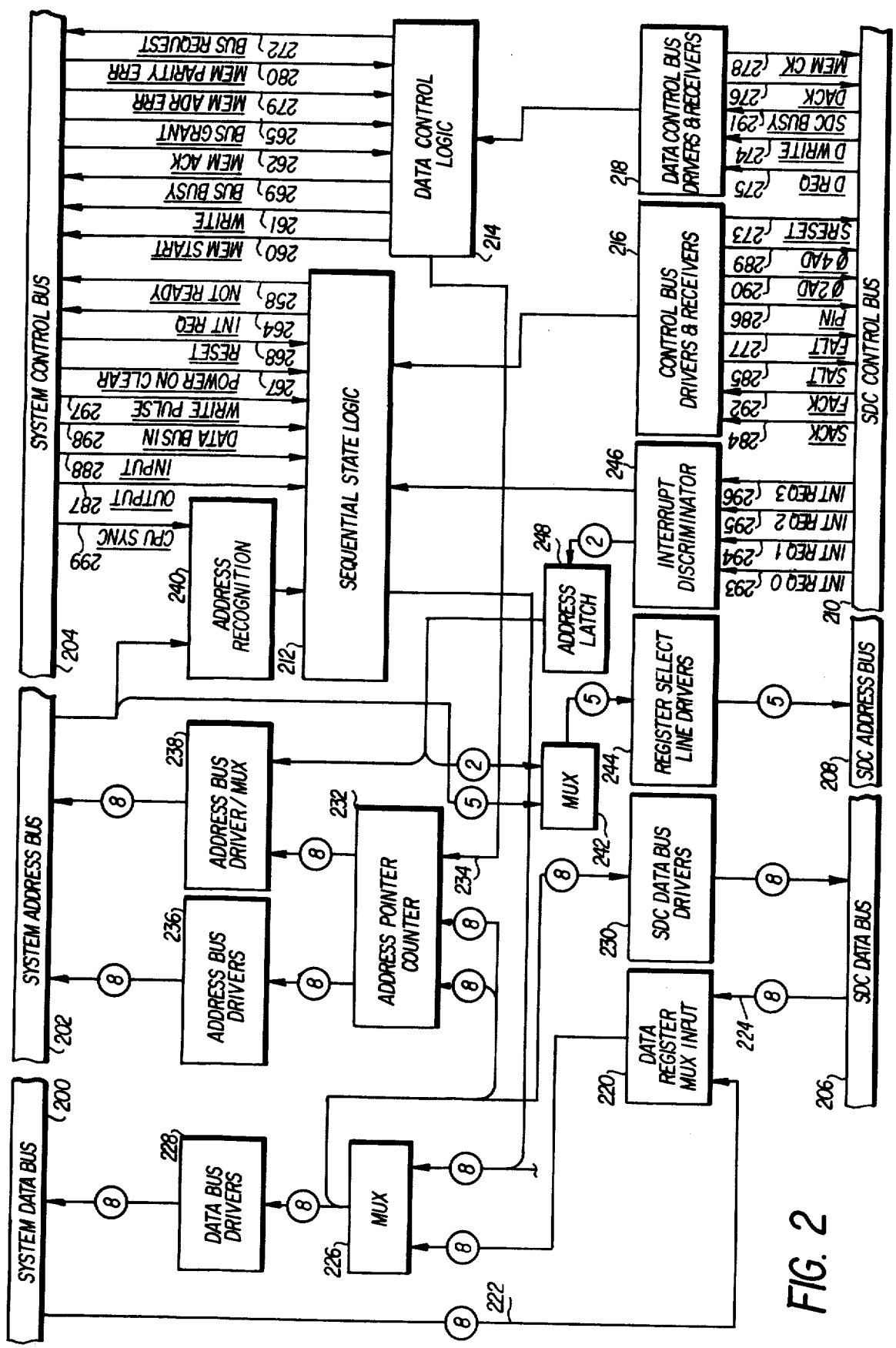
FIG. 2 is a block diagram illustrating the various elements contained within a shared direct memory access controller.

FIG. 2 is a block diagram of the circuitry included within one SDMA 108 (all SDMA's are alike) and illustrates the paths of flow of signals between the SDC bus 124 and the system bus 110. Actually, system bus 110 comprises a system data bus 200, a system address bus 202 and a system control bus 204. In like manner, the SDC bus 124 comprises an SDC data bus 206, an SDC address bus 208 and an SDC control bus 210. System data bus 200 and SDC data bus 206 are bidirectional buses each capable of transferring one byte of information comprising eight parallel bits. System address bus 202 is a bidirectional bus capable of transferring addresses comprising 16 bits. The SDC address bus 208 is a single direction bus for applying 5-bit addresses to the SDC's 122 for the purpose of addressing a specific SDC or selecting a specific register in an SDC that has previously been addressed. As will become evident from the subsequent description, up to 25 registers may be distributed between the SDC's 122 serviced by one SDMA.

The SDMA is provided with a sequential state logic circuit 212 and a data control logic circuit 214 both of which receive control signals from, or transmit control signals to, the bus manager 104, memory 102, or the CPU 100 over the system control bus 204. The sequential state logic circuit 212 applies control signals to, or receives control signals from, the SDC's 122 by way of the SDC control bus 210 and a set of control bus drivers and receivers 216. Data control logic circuit 214 receives control signals from, and transmits control signals to, the SDC's 122 by way of the SDC control bus 210 and a set of data control bus drivers and receivers 218. The logic circuits 212 and 214 are subsequently described in greater detail but it may be noted at this time that they constitute the general controls over the flow of data through the SDMA and control the handshaking operations between the SDMA and SDC's as well as between the SDMA and memory.

The SDMA is provided with a data register 220 and all data passing through the SDMA must pass through this data register. The data register is capable of storing one 8-bit byte and has a multiplexer input for receiving data one byte at a time from the system data bus 200 over a bus 222, or from the SDC data bus 206 over a bus 224. Output data from data register 220 is applied to one set of inputs of a multiplexer (MUX) 226. The output of MUX 226 is connected to the system data bus 200 through a set of a data bus drivers 228, and is connecged to the SDC data bus 206 through a set of SDC data bus drivers 230. Data derived from the accumulator register in CPU 100, or from the main storage 102 may pass over the system data bus 200, through data register 220, MUX 226, the SDC data bus drivers 230, and the SDC data bus 206 to the SDC's 122. On the other hand, data derived from the SDC's 122 and appearing on the SDC data bus 206 may be passed through data register 220, MUX 226, data bus drivers 228, and the system data bus 200, to the CPU 100 and the memory 102.

The output of MUX 226 is connected to a 16-stage binary address pointer counter 232. The purpose of the address pointer 232 is to specifiy a particular address in memory 102. During an input operation, this address represents the address which is to store the next data byte passing through the SDMA from the SDC data gus. On an output operation the address pointer 232 contains the address of the next memory location that is to be read out onto the system data bus 200 from whence it passes through the SDMA to the SDC data bus 206. Since the address pointer 232 has 16 stages, and since only 8 bits may be transferred over the system data bus at one time in order to load the address pointer 232, the output of MUX 226 is connected to both the lower eight stages and the upper eight stages of the address pointer 232. Data control logic 214 produces a signal on a lead 234 to increment the address pointer counter by one for each byte of data transferred through the SDMA. The eight upper order stages of the address pointer counter are connected through a set of address bus drivers 236 to the eight high order leads in the system address bus 202. The eight low order stages of the address pointer counter are connected through a set of address bus drivers/multiplexers 238 to the eight low order leads in the system address bus 202.

Figure 10A:
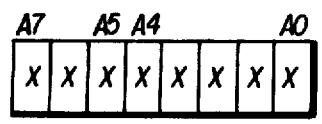
FIGS. 10A-10E illustrate various addressing formats utilized with the shared direct memory access controller.

All of the disc direct memory access controllers 106 and shared direct memory access controllers 108 are capable of recognizing a specific combination of bits in an 8-bit address appearing on the 16-bit system address bus 202. FIG. 10A shows the format of an address byte appearing on the system address bus 202. The three high order bits A7–A5 designate one of the direct memory access controllers 106 or 108. Since the address byte is provided with three bits for this purpose, the described system may have up to eight direct memory access controllers 106 and 108 connected to the system bus 110.

Figure 10B:
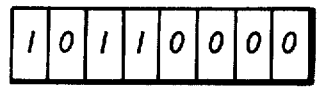
Figure 10C:
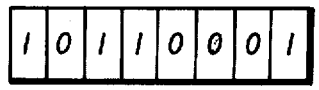
Figure 10D:
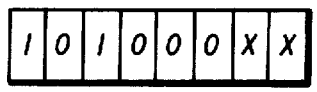

The five low order bits of the address byte are interpreted in different ways depending upon the specific values of the bits. If bit A4 is a one and the four low order bits of the address byte are zeros, the byte specifies the address of the upper portion of the address pointer counter 232 within the direct memory access controller specified by bits A7–A5 of the byte. As an illustration, FIG. 10B shows the address byte configuration for addressing the upper portion of the address pointer counter within the direct memory access unit assigned the address 5. If both bits A0 and A4 of the address byte are ones and bits A1–A3 are zeros then the address byte specifies that the word on the system data bus 200 is to be directed into the lower half of the address pointer counter 232. FIG. 10C shows the format of the address byte for addressing the lower half of the address pointer counter for direct memory access unit 5. If bits A4 and A3 are both zero, then on an input instruction bits A7–A5 specify the direct memory access controller to be utilized while bits A1 and A0 specify which of four SDC's is being addressed. This format is illustrated in FIG. 10D for the case where direct memory access unit five is specified by bits A7–A5.

Referring again to FIG. 2, each SDMA includes an address recognition circuit 240 and all 8-bit address bytes appearing on the eight lower order leads of the system address bus 202 are applied to this address recognition circuit. Each address recognition circuit includes a circuit that is prewired to recognize the address of the direct memory access unit. For the purposes of the present description, it is assumed that the SDMA shown is assigned address 5, i.e. 101, hence address recognition circuit 240 shown in FIG. 2 is wired to recognize and respond to each of the address bytes shown in FIGS. 10B–10E. Each time the address recognition circuit 240 recognizes its own address it provides output signals to control the sequential state logic circuit 212 and the data control logic circuit 214.

As previously noted, up to 25 registers may be distributed between the SDC's 122 and each register may be addressed by an address byte appearing on the system address bus 202. The five low order leads of the system address bus 202 are connected to a multiplexer 242 and the output of the MUX is connected through a set of Register Select Line drivers 244 to the SDC address bus 208 so that the address bits A4–A0 may be applied to the various SDC's 122.

The particular SDC 122 that is selected, and the particular register within the selected SDC that is addressed, is determined by the configuration of the address bits A4–A0. FIG. 10D shows the address byte format for selecting or addressing the status register in one of the SDC's 122 controlled by an SDMA having the address 101. Bits A0 and A1 specify which of the SDC's 122 contains the status register to be addressed, assuming that the SDMA controls only four SDC's, and the presence of zeros in bit positions A2–A4 specifies the fact that the status register is to be selected.

Figure 10E:
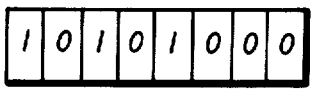

FIG. 10E shows the configuration of an address byte for selecting a particular command register in an SDC. The one bit in position A3 with A0, A1, A2 and A4 being all zeros, specifies that a command register is to be selected and acted upon in the SDC which has previously been selected by an address having the format shown in FIG. 10D.

Each SDMA is provided with an interrupt discriminator means 246 for detecting and allotting priority to interrupt requests received from the SDC's 122 serviced by the SDMA. Each SDC has an individual lead which extends from it over the SDC control bus 210 to an input of the interrupt discriminator. A signal is applied to this lead when the SDC requests an interrupt. The interrupt discriminator 246 determines which of the four SDC's has requested an interrupt and generates a two-bit address which identifies the SDC. This address is applied to an address latch 248 where it is stored, and is also sent back to the SDC to request the SDC to supply an indication of its status. This status is loaded into the data register 220. The output of address latch 248 is applied to one set of inputs of address bus drivers/MUX 238 along with the address of the SDMA. As subsequently explained in greater detail, the interrupt discriminator also applies a signal to the sequential state logic and this causes the SDMA to send an interrupt request over the system control bus 204 to the bus manager 104 once the SDC status is loaded into data register 220. When the interrupt request of the SDMA is granted the SDMA address and the output of address latch 248 are passed through the address bus driver/multiplexers 238 to the system address bus 202. At the same time, the SDC status is gated from the data register 220 onto the system data bus. The address and status are stored in two registers and the bus manager 104 generates a restart vector as disclosed in the application of Derchak and Monaco, Ser. No. 653,409, filed concurrently herewith and fully incorporated herein by reference.

DETAILED LOGIC DESCRIPTION

Figure 3A:
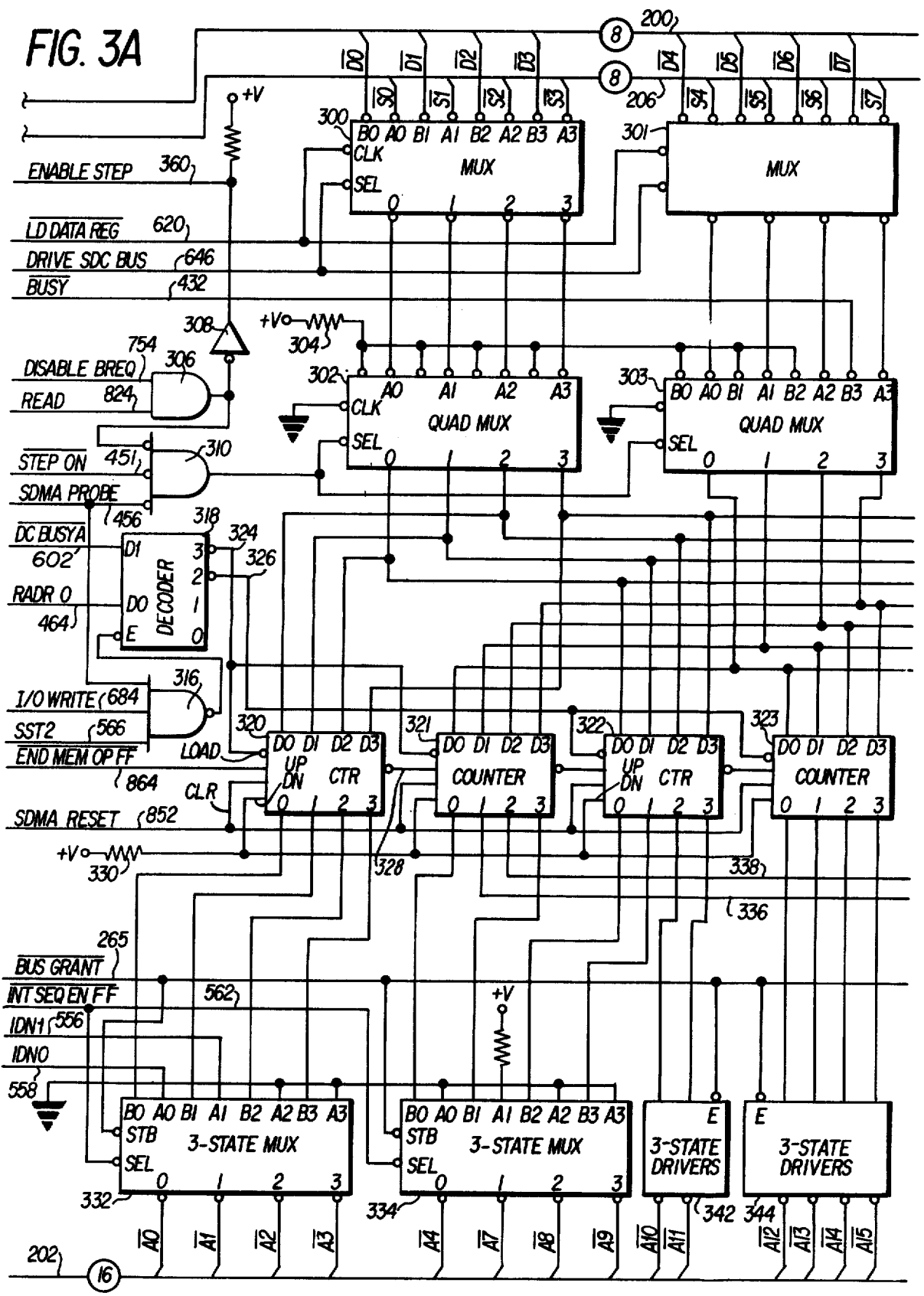
FIGS. 3A and 3B when arranged as shown in FIG. 3C comprise a logic diagram illustrating the main paths of flow of data through a shared direct memory access controller.
Figure 3B:
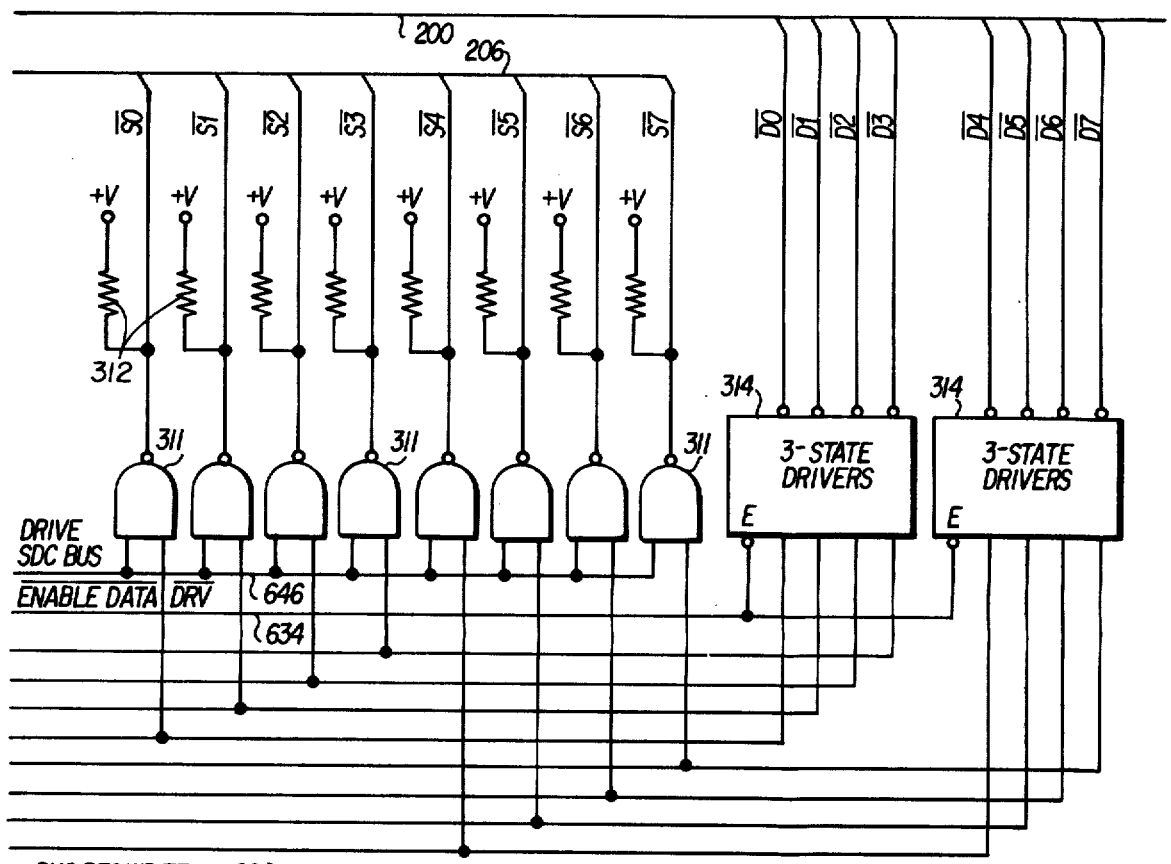
Figure 3B:
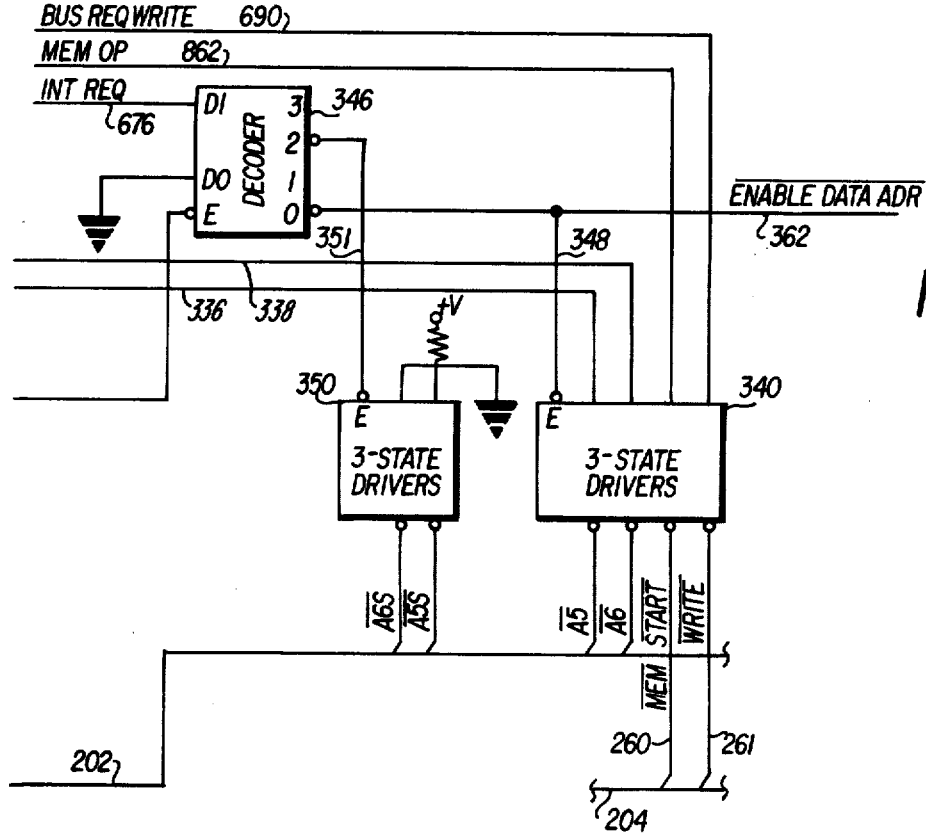
Figure 3C:
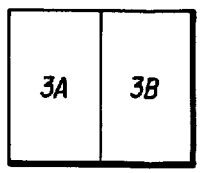

FIGS. 3A and 3B, when arranged as shown in FIG. 3C, show the logic circuits involved in the main data flow paths through the SDMA 108. The system data bus 200 and the SDC data bus 206 extend across the top of the figures while the system address bus 202 extends across the bottom of the figures. The data bits $\overline{D0}$–$\overline{D7}$ appearing on the system data bus 200 are applied to the B inputs of the data register which comprises two sets of latches 300 and 301 having multiplexed inputs. The data bits $\overline{S0}$–$\overline{S7}$ appearing on the SDC data bus 206 are applied to the A inputs of the MUX's 300 and 301. The signal DRIVE SDC BUS is applied to the select input of both of the MUX's. When the signal DRIVE SDC BUS is at the low logic level the A inputs of the MUX's are selected so that data on the SDC data bus 206 may be gated into the register latches and appear at the outputs 0–3 of the MUX's. If the signal DRIVE SDC BUS is at the high logic level then the B inputs of the multiplexers are selected so that the data on the system data bus 200 may be stored in the latches and appear at the outputs of the MUX's. Input data to the MUX's may be gated into the latches only upon occurrence of a low level signal applied to a clock input. The signal $\overline{LD}$ $\overline{DATA\ REG}$ is applied to the clock inputs of both of the MUX's. The outputs of MUX's 300 and 301 are applied to the A inputs of two QUAD MUX's 302 and 303. The B3 input of QUAD MUX 303 receives the signal $\overline{BUSY}$. The remaining B inputs of QUAD MUX 303, as well as all of the B inputs of QUAD MUX 302 are connected through a resistor 304 to +V. The purpose of the B inputs to QUAD MUX's 302 and 303 is to generate the hexadecimal status value 80 if the SDMA is busy at the time it is addressed by the CPU.

The signals DISABLE BREQ and READ are applied to the two inputs of an AND 306. The output of AND 306 passes through an inverter 308 to become the signal ENABLE STEP. The output of AND 306 is applied the one input of a NAND 310 which receives as its other inputs the signals STEP ON and SDMA PROBE. The output of NAND 310 is connected to the select inputs of QUAD MUX's 302 and 303. If the output of NAND 310 is at the low level then the signals appearing at the output of MUX's 300 and 301 are gated through to the outputs of QUAD MUX's 302 and 303. On the other hand, if the output of NAND 310 is at the high level then the status value 80 is gated to the outputs of QUAD MUX's 302 and 303 if the signal $\overline{BUSY}$ is low.

The outputs of QUAD MUX's 302 and 303 are connected to the inputs of eight NAND gates 311. NAND's 311 correspond to the SDC data bus drivers 230 and have their outputs connected to the SDC data bus 206. The output of each NAND is connected through a resistor 312 to +V. NAND's 311 are further enabled by the signal DRIVE SDC BUS and when this signal is at the high level the output of QUAD MUX's 302 and 303 is gated through NAND's 311 to the SDC data bus.

The outputs from QUAD MUX's 302 and 303 are also applied to eight 3-state drivers 314. Drivers 314 correspond to the data bus drivers 228 and have their outputs connected to the system bus 200. Drivers 314 are enabled by the signal $\overline{ENABLE\ DATA\ DRV}$. When this signal is at the low level the output from QUAD MUX's 302 and 303 is gated through drivers 314 to the system data bus 200.

A NAND 316 receives the signals SDMA PROBE, I/O WRITE, and SST 2. When all of these signals are at the high level AND 316 produces a low level output signal to enable a decoder 318. The decoder has a first input D0 which receives the signal RADR-0 and a second input D1 which receives the signal $\overline{DC\ BUSY\ A}$. The signal appearing at input D0 is treated as having the binary value 1 while the signal appearing at input D1 is treated as having the binary value 2. If decoder 318 is receiving a low level enabling signal from NAND 316 and if the signal $\overline{DC\ BUSY\ A}$ is at the high level, than a low level signal will appear at the 3 or 2 output of the decoder depending upon whether the input signal RADR-0 is at the high or the low level. The decoder is enabled only during the interval the SDMA is decoding an address having one of the formats shown in FIGS. 10B and 10C. The signal RADR-0 is derived from the low order address bit and, as previously explained, determines whether the lower half or the upper half of the address pointer counter 232 is to be loaded. The address pointer counter is shown in FIG. 3A as comprising four 4-stage binary counters 320–323.

Each of the counters 320–323 has four data inputs D0–D3 by means of which an initial value may be loaded into the counters. The outputs from QUAD MUX 302 are connected to the data inputs of counters 320 and 322 while the outputs of QUAD MUX 303 are connected to the data inputs of counters 321 and 323. The counters 320–323 may accept data applied to their data inputs only when the counters are receiving a low level signal at an input designated load. The load inputs of counters of 320 and 321 are connected by lead 324 to output 3 of decoder 318. The load inputs of counters 322 and 323 are connected to output terminal 2 of decoder 318. Therefore, if decoder 318 is enabled, the signal $\overline{DC\ BUSY\ A}$ is at the high level, and the signal RADR-0 is at the high level, the low level output signal on lead 324 enables counters 320 and 321 so that they are loaded with the value appearing at the output of QUAD MUX's 302 and 303. On the other hand, if the signal RADR-0 is at the low level, then a low level signal on lead 326 enables counters 322 and 323 so that they are loaded with data from the outputs of QUAD MUX's 302 and 303.

Once the counters 320–323 have been loaded, the value contained therein may be incremented by applying a high level signal to the input terminals designated UP. The UP terminals of counter 320 receives the signal $\overline{END\ MEM\ OP\ FF}$. Counter 320 has a carry output terminal that is connected by lead 328 to the UP terminal of counter 321. In like manner, the carry outputs from counters 321 and 322 are connected to the UP inputs of the next higher order counters.

The counters 320–323 are up-down counters. However, the down input terminals are connected through a resistor 330 to +V so that the counters never count in the downward direction. The signal SDMA RESET is applied to a clear input terminal of each of the counters 320–323 and when this signal is at the high level it clears the counters.

The outputs from the four stages of counter 320 are applied to the B inputs of a 3-state MUX 332. The B inputs of a 3-state MUX 334 are connected to receive signals from the lowest order and the highest order of counter 321 and from the two lowest orders of counter 322. The two middle orders of counter 321 are connected by leads 336 and 338 to two 3-state drivers on a 3-state driver chip 340. The two highest orders of counter 322 are connected to two drivers on a 3-state driver chip 342 while the four outputs from counter 323 are connected to four drivers on a 3-state driver chip 344. The signal $\overline{INT\ SEQ\ EN\ FF}$ is applied to the select inputs of 3-state MUX's 332 and 334. The signal $\overline{BUS\ GRANT}$ is applied to the strobe inputs of 3-state MUX's 332 and 334 as well as the enabling inputs of 3-state drivers 342 and 344 and a decoder 346. Decoder 346 functions in the same manner as decoder 318. The D0 input of decoder 346 is tied to the logic zero level and the D1 input receives the signal INT REQ. The zero output of decoder 346 is the signal $\overline{ENABLE\ DATA\ ADR}$ and it is connected by lead 348 to the enabling input of 3-state drivers 340. Decoder output terminal 2 is connected to the enabling input of 3-state driver chip 350.

The contents of counters 320–323 may be gated onto the system address bus 202 for the purpose of addressing main storage. If the signal $\overline{INT\ SEQ\ EN\ FF}$ is at the high level when the signal $\overline{BUS\ GRANT}$ drops to the low level, the signals applied to the B inputs of MUX's 332 and 334 are gated onto the system address bus 202 to become the address bits $\overline{A0}$–$\overline{A4}$ and $\overline{A7}$–$\overline{A9}$. At the same time, the signal $\overline{BUS\ GRANT}$ enables 3-state drivers 342 and 344 so that the contents of counters 322 and 323 are gated onto the system address bus at the bits $\overline{A10}$–$\overline{A15}$. The signal $\overline{BUS\ GRANT}$ enables decoder 346 and since the signal INT REQ will be at a low level, a low level signal will appear on lead 348 to enable 3-state drivers 340. This gates the signals on leads 336 and 338 onto the system address bus as the address bits $\overline{A5}$ and $\overline{A6}$.

When an SDC 122 makes an interrupt request, it is necessary to place on the system address bus 202 an identification of the particular SDC which is making the request as well as an identification of the SDMA which services that SDC. The address is essentially an 8-bit address placed on the lower order leads A7–A0 of the system address bus 202 and having the format shown in FIG. 10D.

Bits A5–A7 of the address identify the specific SDMA and are determined by the physical location of the SDMA card. Since it is assumed that the SDMA illustrated in FIGS. 3A and 3B has the identifying number 5, bits A7–A5 should have the value 101. In FIG. 3A, the A1 input of 3-state MUX 334 is tied through a resistor to +V. In FIG. 3B, the 3-state drivers for driving address lines A5 and A6 are tied to +V and ground respectively.

When an SDC 122 signals the SDMA that it is making and interrupt request, the SDMA circuits decode the request as subsequently described in order to generate two binary bits identifying the number of the SDC. These identifying bits, IDN-0 and IDN-1, are sent back to the SDC to request that status be loaded into the data register of the SDMA. IDN-0 and IDN-1 are applied to the A0 and A1 inputs respectively of 3-state MUX 332. The A2 and A3 inputs of 3-state MUX 332 and the A0, A2 and A3 inputs of 3-state MUX 334 are all tied to ground. When an interrupt is recognized by the SDMA the signal $\overline{INT\ SEQ\ EN\ FF}$ drops to the low level to select the A inputs of 3-state MUX's 332 and 334. Also, in FIG. 3B the signal INT REQ rises to the high level when the interrupt is recognized and thus conditions the decoder 346 to produce a low level output signal on lead 351 if the decoder should be enabled. When the signal $\overline{BUS\ GRANT}$ drops the the low level the A inputs of 3-state MUX's 332 and 334 are gated through to the system address bus 202. The $\overline{BUS\ GRANT}$ signal also enables decoder 346 and a low level output signal on lead 351 enables 3-state drivers 350 so as to place the binary value 01 on address bus leads $\overline{A6S}$ and $\overline{A5S}$. The signals placed on the lower eight orders of the system address bus thus represent the value 101000XX where the X's are determined by IDN 0 and IDN 1. At the same time, and as subsequently described in detail, the SDC status is gated on the system data bus through drivers 314.

FIG. 3B shows the circuits for generating certain memory control signals when an address in the counters 320–323 is placed on the system address bus 202. At the time the signal $\overline{BUS\ GRANT}$ drops to the low level to strobe the address onto the address bus, it enables decoder 346 and the signal $\overline{ENABLE\ DATA\ ADR}$ drops to the low level. Two drivers on the 3-state driver chip 340 receive the signals BUS REQ WRITE and MEM OP respectively, and at the same time the address is strobed onto the address bus these drivers are strobed to produce the memory control signals $\overline{MEM\ START}$ and $\overline{WRITE}$. These latter signals are applied to the memory controls over the system control bus 204 to cause the memory to perform a read or a write operation.

Figure 4:
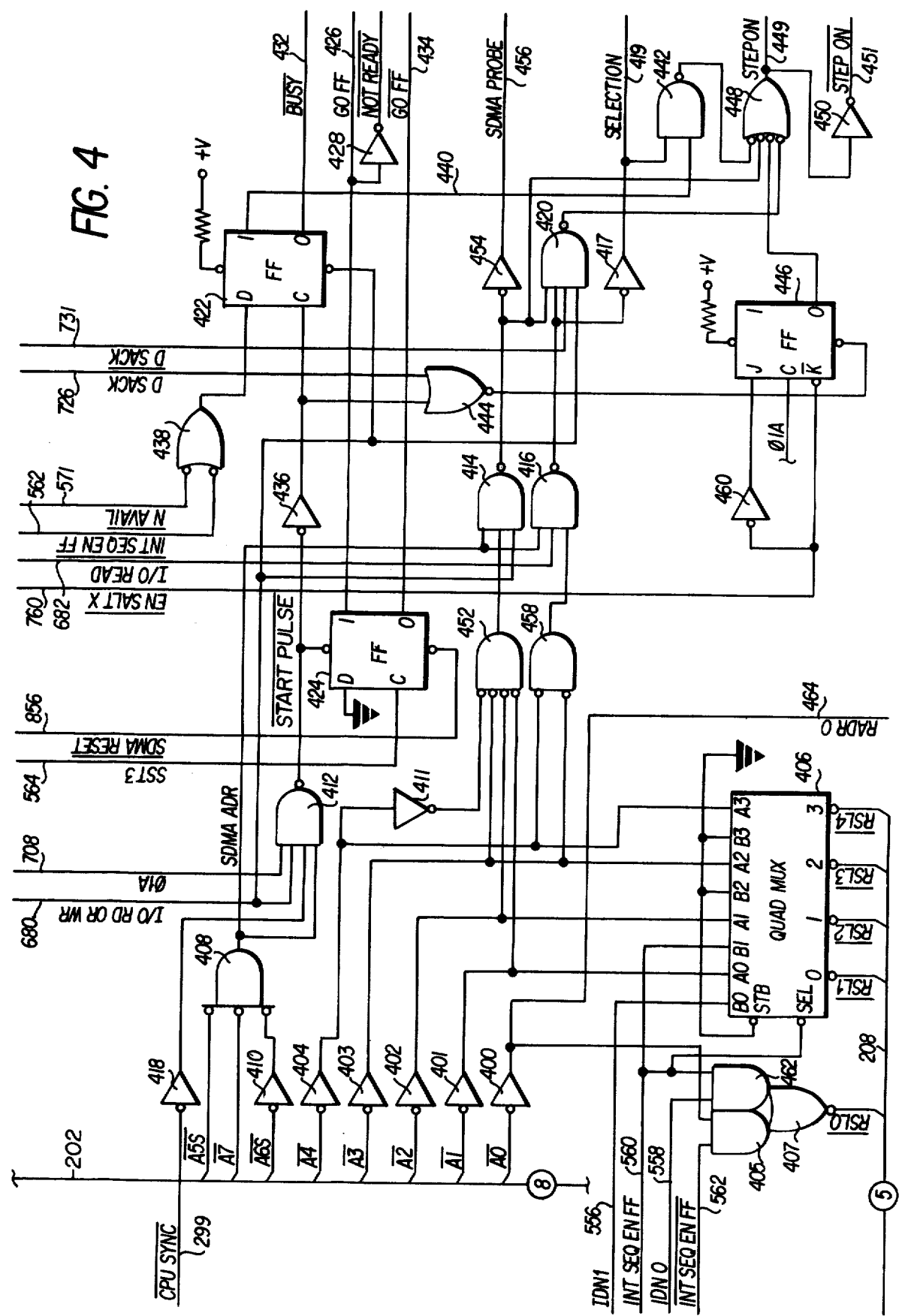
FIG. 4 shows the address recognition circuits and the register select multiplexer.

FIG. 4 shows the address recognition circuits and the path followed by an address in passing through the SDMA from the system address bus 202 to the SDC address bus 208. Address bits $\overline{A1}$–$\overline{A4}$ are passed through a set of inverters 401–404 having their outputs connected to the A inputs of a multiplexer 406. The strobe input of MUX 406 is tied to ground and the select input receives the signal INT SEQ EN FF. If the signal INT SEQ EN FF is at the low level the address bits $\overline{A1}$–$\overline{A4}$ are gated through inverters 401–404 and the MUX 406 to the SDC address bus 208. An AND 405 receives the output of inverter 400 and the signal $\overline{INT\ SEQ\ EN\ FF}$ hence when A1–A4 are gated through MUX 406, $\overline{A0}$ is gated through AND 405 and NOR 407 to the SDC address bus.

A NAND 408 is provided for recognizing the address of the SDMA when that address appears on the system address bus 202. Since it is assumed that the present SDMA is assigned address 5, address bits $\overline{A7}$ and $\overline{A5S}$ are applied directly to NAND 408 while address bit $\overline{A6S}$ is passed through an inverter 410 before being applied to NAND 408. When the system address bus bits $\overline{A7}$–$\overline{A5S}$ have the value 101, NAND 408 produces a high level output signal that enables one input of NAND's 412, 414 and 416. In actual practice, the address recognition circuits of all SDMA's may be identical and the SDMA card position and back plane wiring utilized to determine exactly which address will be recognized by the SDMA.

The CPU places a signal $\overline{\text{CPU SYNC}}$ on the system control bus at about the time that an address is placed on the system address bus. The signal $\overline{\text{CPU SYNC}}$ is passed through an inverter 418 and applied to a second input of NAND 412. The signal I/O RD or WR is at a high level any time an input or an output instruction is on the system control bus. The signal I/O RD or WR is applied to a further input of NAND 412 and is also applied to one input of NAND 414, a NAND 420 and the reset input of a D-type flip-flop 422. NAND 412 also receives the clock pulse ϕ1A. Therefore, if an input or an output instruction is present on the system control bus and the address on the system address bus is that of the SDMA, NAND 412 produces a low level output signal that is applied to the set input of a GO FF 424. This sets the flip-flop so that the signal GO FF on output lead 426 rises to the high level. The signal on lead 426 is passed through an inverter 428 to become the signal $\overline{\text{NOT READY}}$. The signal $\overline{\text{NOT READY}}$ is sent back to the CPU over the system control bus 204 to stop execution of the instruction and initiate a waiting state while the SDMA performs its task.

The low level output of NAND 412 is passed through an inverter 436 and applied to the clock input of flip-flop 422. A NOR 438 receives the signals $\overline{\text{NAVAIL}}$ and $\overline{\text{INT SEQ EN FF}}$ and has its output connected to the D input of flip-flop 422. If the SDMA is available to carry out the instruction the output of NOR 438 will be at the low level and the signal from inverter 436 will insure that the flip-flop 422 is reset. This drives the signal $\overline{\text{BUSY}}$ to the high level and prevents a busy status indication from being generated for the SDMA. Should the SDMA be busy then the D input of flip-flop 422 will be at a high level and the high level output from inverter 436 will set the flipflop thus driving the signal $\overline{\text{BUSY}}$ to the low level to generate the busy status. At the same time, the set output of flip-flop 422 is applied over lead 440 to a NAND 442.

The high level output of inverter 436 is passed through a NOR 444 to the reset input of a flip-flop 446. The reset output of this flip-flop is connected to one input of a NOR 448 so the flip-flop can produce an output signal through the NOR only when the flip-flop is reset. The output of NOR 448 is the signal STEP ON. This signal is passed through an inverter 450 to become the signal $\overline{\text{STEP ON}}$.

A NAND 452 is provided for recognizing that an address on the system address bus 202 specifies that the address pointer counter 232 is to be loaded. NAND 452 is connected to the outputs of inverters 401-403 and by inverter 411 to the output of inverter 404. NAND 452 produces a high level output signal when bits A1-A3 of the address are all zeros and A4 is a one. Thus, it recognizes either of the address formats shown in FIGS. 10B and 10C. The output of NAND 452 is applied to NAND 414 which further receives the signals SDMA ADR and I/O RD or WR. NAND 414 thus produces a low level output signal on an input or an output instruction if the address on the system address bus 202 specifies this particular SDMA and further specifies the address of the address pointer counter. The low level output signal from NAND 414 is passed through an inverter 454 to become the signal SDMA PROBE. The probe signal is applied to FIG. 3A where it enables the decoder 318 controlling the loading of the address pointer counter, and further controls MUX's 302 and 303 so as to gate the data on the system data bus 200 through the MUX's to the address pointer counter.

The low level output of NAND 414 is applied to NOR 448 to generate the signal STEP ON. In addition, the output of NAND 414 is connected to an input of NAND 420. NAND 420 is further energized by the output of NAND 416 during a read operation when address bits A3 and A4 are both zeros. NAND 416 is connected to an inverter 417 to generate the signal SELECTION when the CPU executes an input instruction to select an SDC and read into the accumulator the status of the selected SDC. The outputs of inverters 403 and 404 are connected to the inputs of a NAND 458 and the output of NAND 458 is applied to NAND 416. NAND 416 further receives the signal I/O READ, and is enabled by the output of NAND 408 when the SDMA address is recognized.

In addition to being conditioned by the outputs of NAND's 414 and 416, NAND 420 receives the signals $\overline{\text{D SACK}}$ and I/O RD OR WR. The output of NAND 420 is applied to still another input of NOR 448 for the purpose of generating the signal STEP ON.

The signal $\overline{\text{ENABLE SALT X}}$ is applied directly to the $\overline{\text{K}}$ input of flip-flop 446 and is passed through an inverter 460 to the J input of the flip-flop. When the signal $\overline{\text{ENABLE SALT X}}$ is at a low level flip-flop 446 is set as the clocking signal ϕ1A goes to the high level. When the signal $\overline{\text{ENABLE SALT X}}$ is at the high level, the clocking signal has no effect on the flip-flop.

When an SDC 122 requests an interrupt it is applied to the SDMA and, if the SDMA is not otherwise occupied the interrupt request is granted. The SDMA generates the address of the recognized SDC 122 and applies it back over the SDC address bus to select the SDC. In FIG. 4, the signals IDN 0 and IDN 1 represent the two bits of the generated SDC address. The signal IDN 0 is applied to one input of an AND 462 while the signal IDN 1 is applied to the B0 input of QUAD MUX 406. The signal INT SEQ EN FF is at a high level when the SDMA has recognized an interrupt request. The signal INT SEQ EN FF is applied to the B1 input and the select control input of QUAD MUX 406 as well as to the second input of AND 462. The output of AND 462 passes through NOR 407 to become the low order address bit. The B3 and B2 inputs as well as the strobe input of QUAD MUX 406 are all tied to ground level. Therefore, as soon as the signal INT SEQ EN FF rises to the high level, it selects the B inputs of QUAD MUX 406 for application to the SDC address bus 208. Thus, there is placed on the address bus an address having the format 001XX where the X's may be zeros or ones and represent the address of the interrupting SDC. The 1 bit in $\overline{\text{RSL 3}}$ signals the SDC to report its interrupt status as opposed to its selection status. The interrupting SDC recognizes and responds to this address by placing its interrupt status on the SDC data bus.

Figure 5:
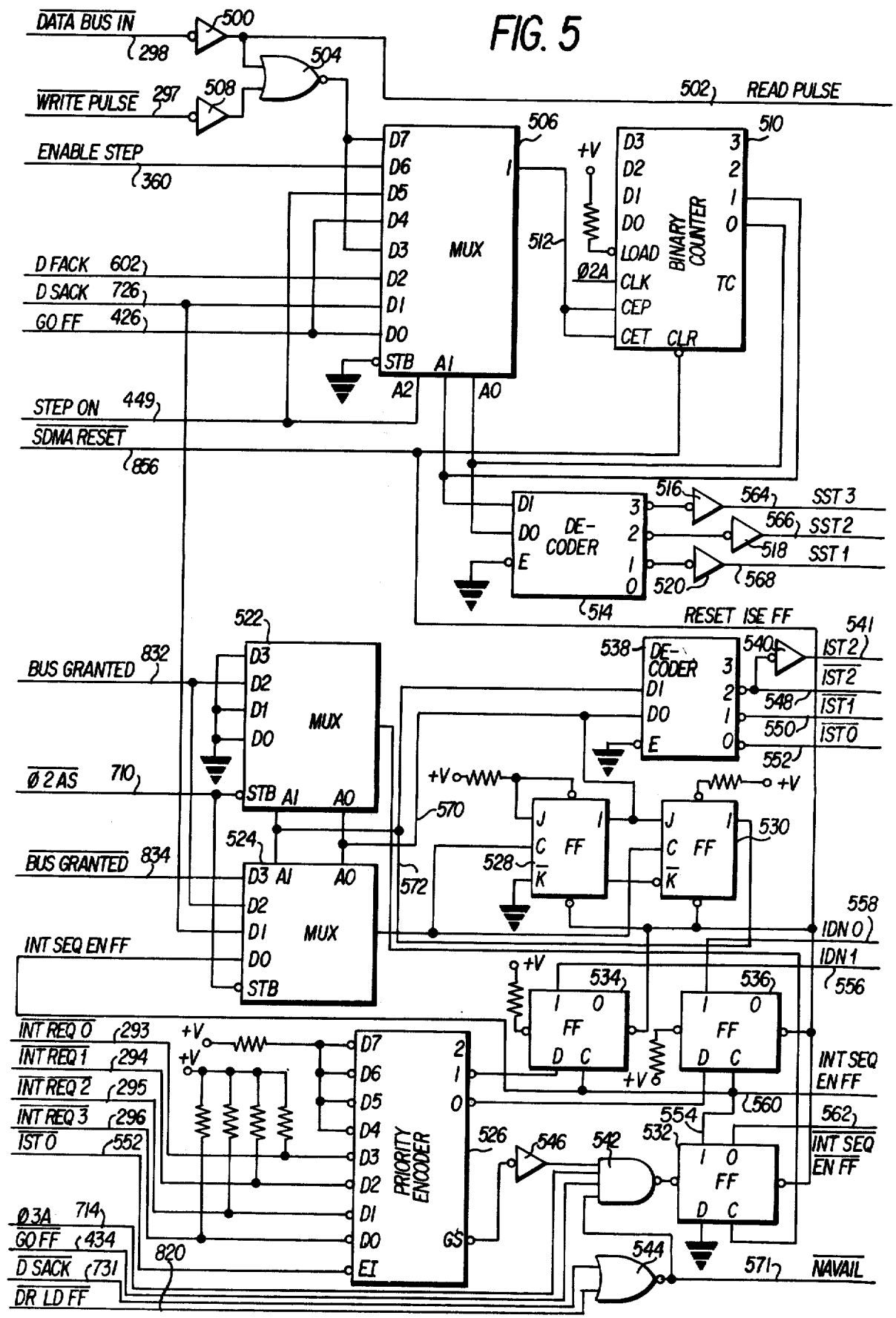
FIG. 5 shows the primary sequential state logic circuits.

FIG. 5 shows the details of the major portion of the sequential state logic circuits 212. The signal $\overline{\text{DATA BUS IN}}$ is derived from the system control bus 204 and is passed through an inverter 500 to become the signal READ PULSE. $\overline{\text{DATA BUS IN}}$ is generated by the CPU 100 and drops to the low level at ϕ3A when an input instruction is being generated to tell the devices connected to the system bus that the CPU is ready to accept into its accumulator register any data placed on the system data bus. The signal READ PULSE is passed through a NOR 504 and applied to the D7 and D3 inputs of a multiplexer 506. The signal $\overline{\text{WRITE PULSE}}$ is also derived from the system control bus and it is passed through an inverter 508 and the NOR 504 to the D7 and D3 inputs of MUX 506. $\overline{\text{WRITE PULSE}}$ is generated by the CPU during output instructions to tell devices connected to the system bus that data is present thereon and ready for sampling. MUX 506 receives the signal ENABLE STEP at its D6 input, the signal D FACK at its D2 input, D SACK at its D1 input, and GO FF at both its D0 and D4 inputs. The signal STEP ON is applied to the D5 input as well as the A2 selection input of MUX 506. The A0 and A1 inputs of MUX 506 are connected to the outputs of the first and second stages of a modulo-4 binary counter 510. The strobe input of MUX 506 is connected to ground and the output of the MUX is connected by lead 512 to the CEP and CET terminals of the counter 510.

MUX 506 responds to the combinations of signals at its selection inputs A0-A2 to connect one of its data inputs D0-D7 to the output lead 512. For example, if the signals applied to A0-A2 are all at the low level than the D0 input of the MUX is connected to its output lead. If A2 and A1 are both at the low level and A0 is at the high level then the D4 input of the MUX is connected to its output lead.

The binary counter 510 has four data inputs which are not utilized so its load terminal is connected through a resistor to +V. The counter is advanced by a positive-going clock signal $\phi$2A if the signal on lead 512 is at the high level at the time the clock pulse occurs. The counter has four binary stages only two of which are utilized in the present application. The counter may be reset by applying a low level signal $\overline{\text{SDMA RESET}}$ to its clear input terminal.

The zero and one stages of binary counter 510 are connected to the D0 and D1 inputs respectively of a decoder 514. The decoder 514 is permanently enabled by connecting its enabling input to ground, hence the decoder continuously produces at one of its outputs a signal indicating the value stored in the binary counter 510, if that value is between one and three. The counter 510 normally contains a count of zero hence the decoder 514 normally produces a low level signal at its zero output which is not used. The three, two and one output terminals of the decoder are connected through inverters 516, 518 and 520 respectively to produce the signals SST3, SST2, and SST1.

The lower portion of FIG. 5 shows the primary circuits for initiating and controlling an interrupt sequence. These circuits include two MUX's 522 and 524, a priority encoder 526, two JK flipflops 528 and 530, three D-type flip-flops 532, 534 and 536, and a decoder 538. The decoder 538 produces the signals $\overline{\text{IST 0}}$, $\overline{\text{IST 1}}$ and $\overline{\text{IST 2}}$ which indicate the state of the SDMA during an interrupt sequence. The signal $\overline{\text{IST 2}}$ is passed through an inverter 540 to provide the signal IST 2.

The flip-flop 532 is the interrupt sequence enable flip-flop. It is set in response to an interrupt request from an SDC provided the SDMA is not otherwise engaged. These conditions are determined by a NAND 542. The signals $\overline{\text{D SACK}}$ and $\overline{\text{DR LD FF}}$ are applied to a NOR 544 and the output of the NOR is applied to one input of NAND 542. The output of NOR 544 is the signal $\overline{\text{NA-VAIL}}$. The signal $\overline{\text{GO FF}}$ is applied to a second input of NAND 542 and a third input receives the $\phi$3A clock signal. The GS output of priority encoder 526 is passed through an inverter 546 and applied to the fourth input of NAND 542.

Priority encoder 526 has eight inputs D0-D7 with inputs D4-D7 being inactive and tied to +V. Each of the data inputs D0-D3 is tied to a line which extends through the SDC control bus to an individual one of the SDC's. The signals $\overline{\text{INT REQ 0}}$, $\overline{\text{INT REQ 1}}$, $\overline{\text{INT REQ 2}}$ and $\overline{\text{INT REQ 3}}$ are derived from the SDC's 122 which are assigned the device numbers 0, 1, 2 and 3 respectively. The priority encoder 526 is enabled by the signal $\overline{\text{IST 0}}$ on lead 552. This signal is derived from the decoder 538 and is at a low level to enable the priority encoder anytime the SDMA is in a condition to accept an interrupt request. The priority encoder 526 accepts a signal at one of its inputs D0-D3 and, depending upon which input terminal is active, produces a 2-bit binary value at its output corresponding to the number assigned to the SDC which made the interrupt request. The "one" output of the encoder is connected to the D input of flip-flop 534 while the "zero" output of the encoder is connected to the D input of flip-flop 536.

The priority encoder has a GS output that is active at any time the encoder receives an interrupt request signal provided the encoder input E1 is at the low level. The output from the encoder passes through inverter 546 and conditions NAND 542. If the SDMA is otherwise in condition to execute an interrupt, NAND 542 produces a low level output signal to set flip-flop 532. The set output of flip-flop 532 is connected to the clocking inputs of flip-flops 534 and 536. When flip-flop 532 is set the signal on lead 554 sets flip-flops 534 and 536 in accordance with the two data outputs from the priority encoder 526. Thus, it is seen that the flip-flops 534 and 536 correspond to the address latch 248. The output of flip-flop 534 is the signal IDN 1 on lead 556 and the output of flip-flop 536 is the signal IDN 0 in lead 558.

MUX's 522 and 524 are similar in that they each have a strobe input connected to receive the clock signal $\overline{\phi\text{2AS}}$, four data inputs D0-D3 which may be selectively gated through to the multiplexer output, and two addressing inputs A0 and A1 for determining which of the data inputs is to be gated through to the output. Data inputs D0, D1 and D3 of MUX 522 are tied to the logic zero level while the D2 input receives the signal BUS GRANTED. MUX 524 receives the signal $\overline{\text{BUS GRANTED}}$ at its D3 input, BUS GRANTED at its D2 input, D SACK at its D1 input, and INT SEQ EN FF at its D0 input. This latter signal is derived from the interrupt sequence enable flip-flop 532 and rises to the high level when an interrupt is recognized. The output of MUX 524 is connected to the clocking inputs of the flip-flops 528 and 530 which act as a two stage counter. The J input of flip-flop 528 is connected to +V while the $\overline{\text{K}}$ input is connected to ground. The set and reset outputs of FF 528 are connected to the J and $\overline{\text{K}}$ inputs of FF 530. The set output of FF 530 is connected to the D1 input of the decoder 538 and to the A1 inputs of MUX's 522 and 524. The set output of FF 528 is connected to the D0 input of decoder 538 and the A0 input of MUX's 522 and 524.

When the interrupt enable flip-flop 532 is set, then at the following $\phi$2 time the signal from the flip-flop is strobed through MUX 524 to set FF 528. The output from FF 528 enables the A0 inputs of MUX's 522 and 524 so that they are now able to respond to a high level signal on their D1 inputs. In addition, the output of FF 528 enables the D0 input of decoder 538 and the decoder produces the low level output signal $\overline{\text{IST 1}}$. At the same time, the signal $\overline{IST\ 0}$ rises to the high level and disables the priority encoder 526 so that it cannot accept another interrupt request.

During $\overline{IST\ 1}$ the circuits of FIG. 4 apply the address of the interrupting SDC 122 back to the SDC. As subsequently explained, the signal $\overline{SALT}$ generated in FIG. 8 acts with this address to select the SDC whose interrupt is granted priority. The SDC responds with a signal $\overline{SACK}$ as subsequently described, which in turn results in the signal DSACK rising to the high level. At the next $\phi2AS$, the signal DSACK passes through MUX 524 to reset FF 528 and set FF 530. At this time the lead 570 drops to the low level and the lead 572 rises to the high level thus enabling the A1 inputs to MUX's 522 and 524 and the D1 input to decoder 538. With input D1 high and input D0 low, decoder 538 terminates the low level signal $\overline{IST\ 1}$ and drops the signal $\overline{IST\ 2}$ to the low level. During the interval of the signal $\overline{IST\ 2}$ the SDMA sends a signal $\overline{FALT}$ to the selected SDC. The SDC responds with a signal $\overline{FACK}$ (FIG. 6) to generate an interrupt request from the SDMA to the bus manager, and load the SDC status into the SDMA data register. When the SDMA is granted access to the bus the signal BUS GRANTED rises to the high level. On the next following $\phi2A$ the BUS GRANTED signal is strobed through MUX 524 to set FF 528. At the same time, the BUS GRANTED signal passes through MUX 522 to reset the interrupt sequence enable flip-flop 532.

With flip-flops 528 and 530 set the signals on leads 570 and 572 are both at the high level and the decoder 538 produces no output signal. The signals on leads 570 and 572 select the D3 inputs of MUX's 522 and 524. After the status information has been transferred over the system data bus, the signal $\overline{BUS\ GRANTED}$ rises to the high level. On the next $\phi2$ the signal $\overline{BUS\ GRANTED}$ is strobed through MUX 524 and resets flip-flops 528 and 530. At this time, the decoder 538 again produces the signal $\overline{IST\ 0}$ to thereby enable the priority encoder 526 so that it may accept another interrupt request.

Figure 6:
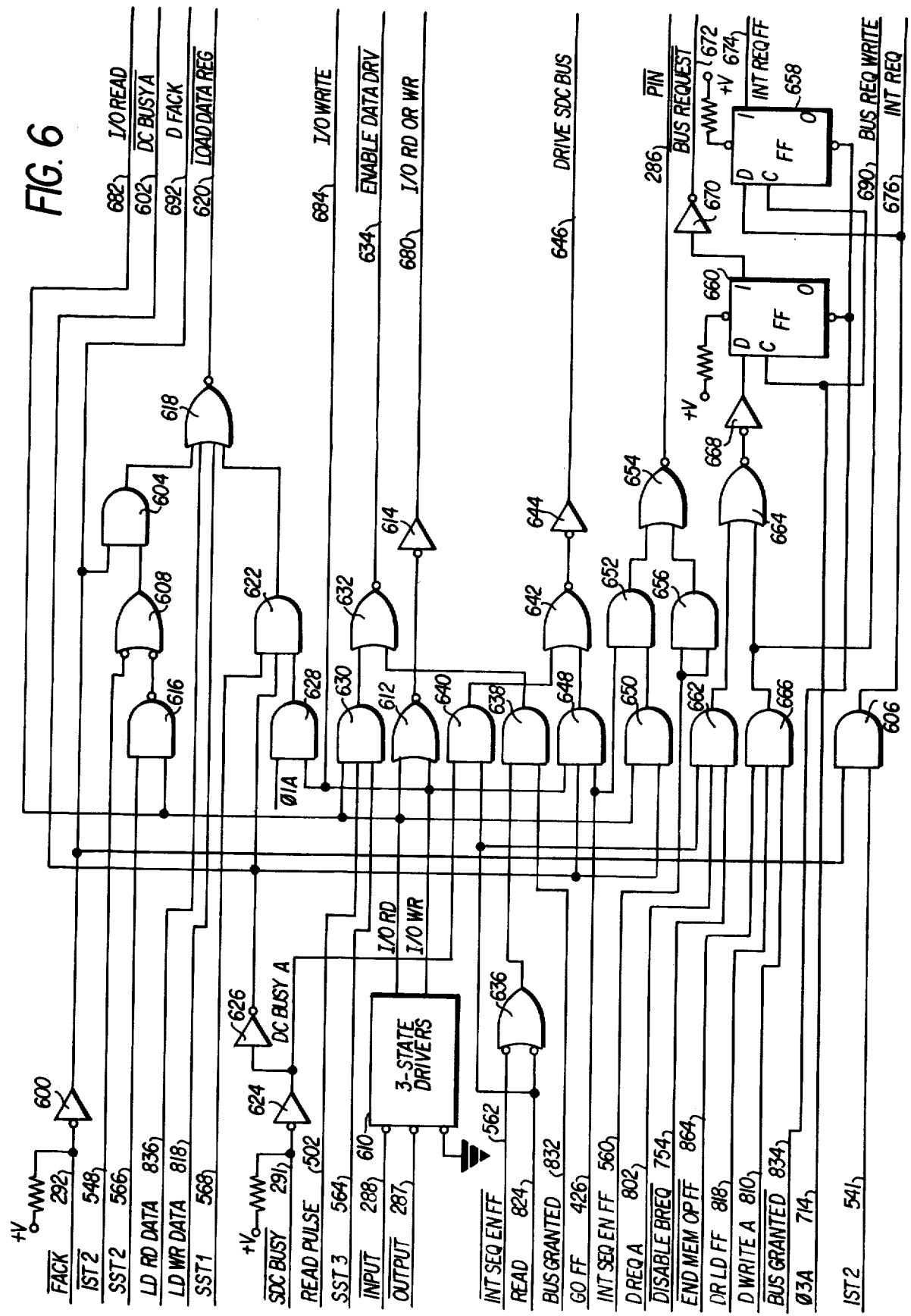
FIG. 6 shows the Bus Request and Interrupt Request Flip-flops and various gating circuits.
Figure 7:
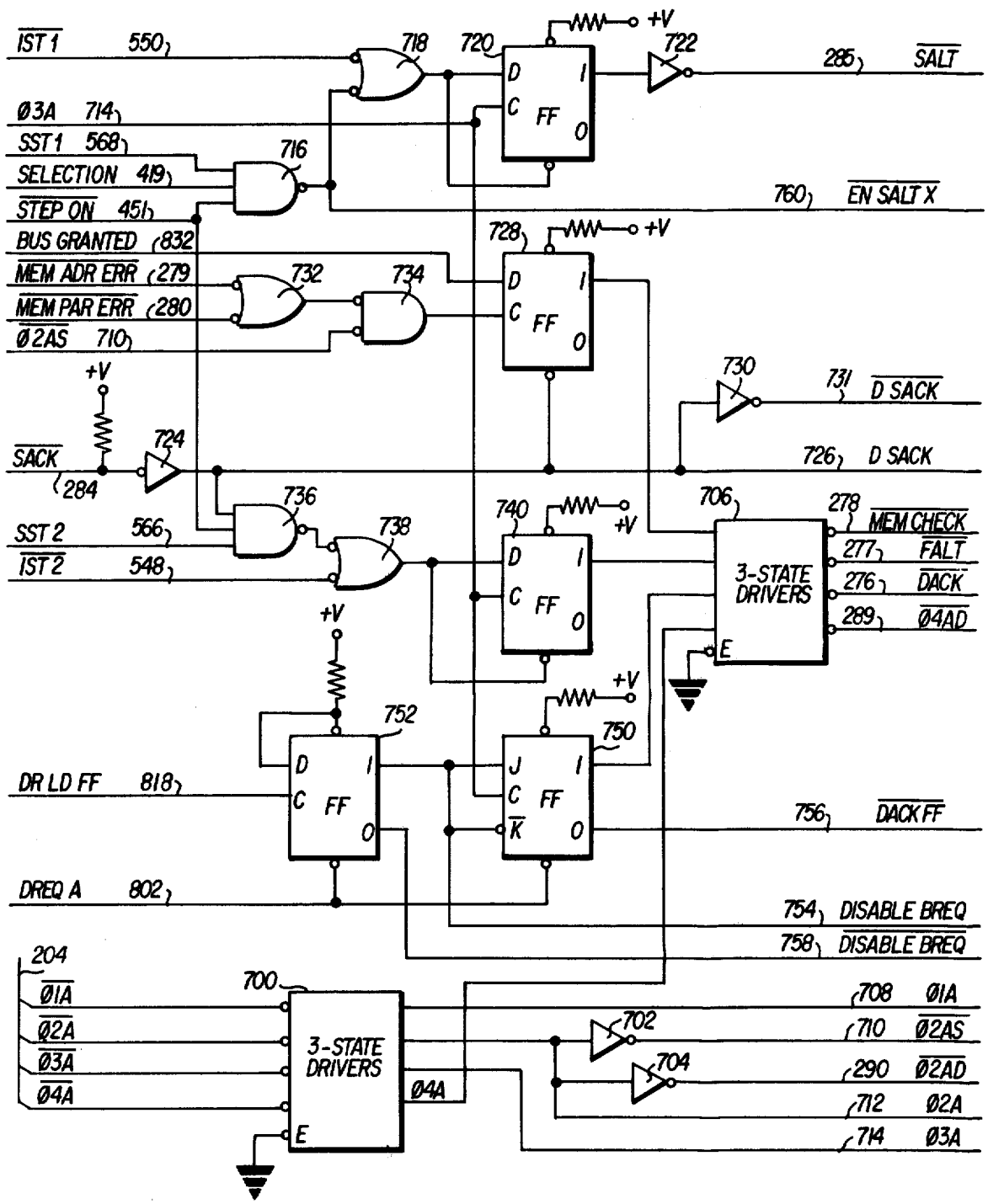
FIG. 7 shows the SALT, SACK, FALT and DACK Flip-flops.
Figure 8:
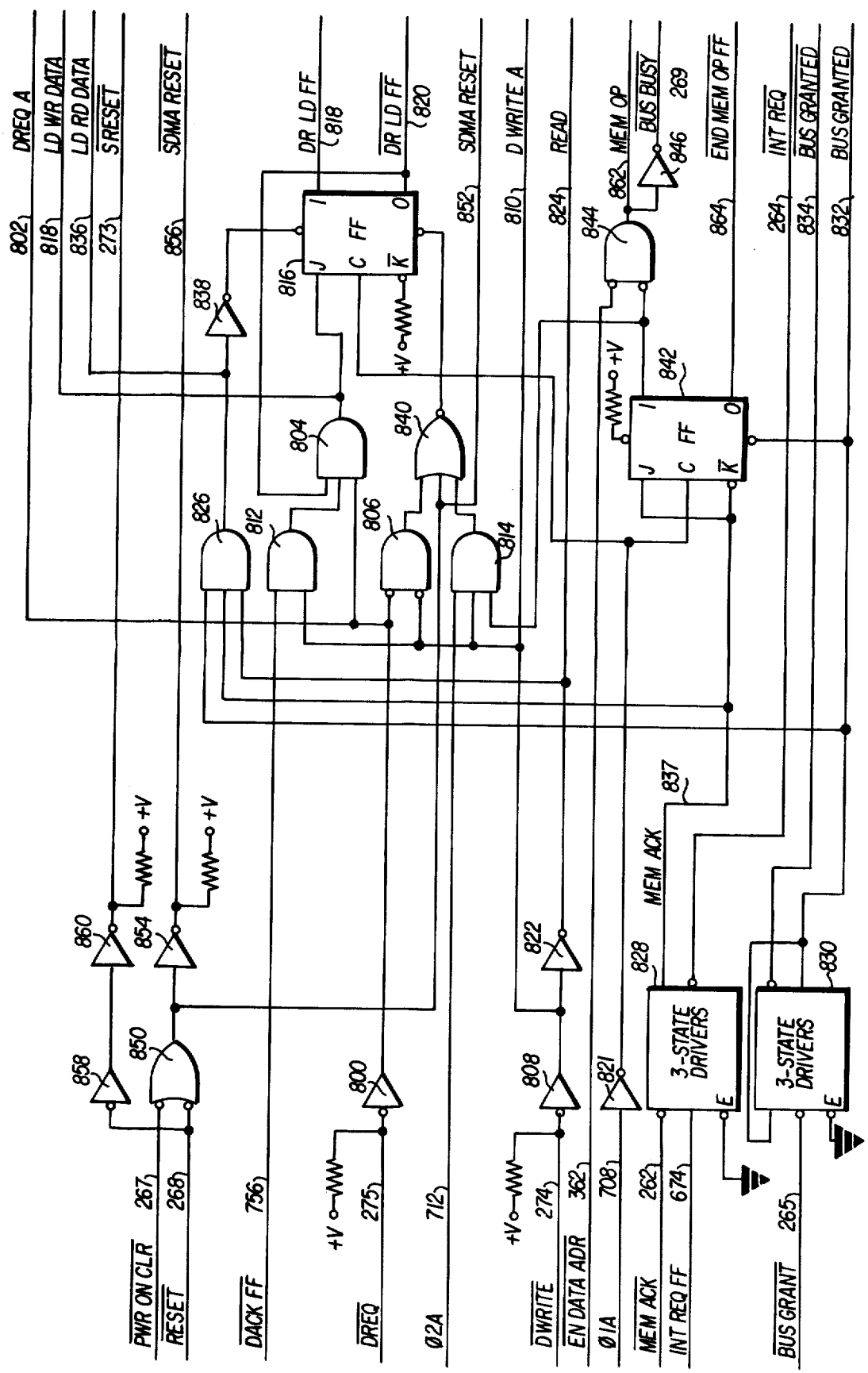
FIG. 8 shows the Data Register Load and End Memory Operation Flip-flops.

FIGS. 6, 7 and 8 show some of the logic circuits included in data control logic 214, and further show some of the drivers and receivers responsive to or connected to the system control bus 204 and the SDC control bus 210. These circuits will be described briefly at this time. Their full function will become evident when various sequences of operation are subsequently described.

In FIG. 6, the signal $\overline{FACK}$ is derived from the SDC control bus and is inverted by an inverter 600. The output of inverter 600 is the signal DFACK which is applied to one input of two AND gates 604 and 606. The signal $\overline{IST\ 2}$ is applied to one input of a NOR 608 and the output of NOR 608 is connected to a second input of AND 604.

The signal $\overline{INPUT}$ is derived from the system control bus 204 and is applied to a 3-state driver on a logic chip 610. The signal $\overline{INPUT}$ is active and drops to the low level when the CPU decodes an instruction and finds that it is an input instruction. When the signal $\overline{INPUT}$ drops to the low level the driver chip 610 produces a high level output signal I/O RD. This signal is applied to one input of a NOR 612 having its output connected to an inverter 614. The signal $\overline{OUTPUT}$ drops to the low level when the CPU decodes an instruction and determines that an output operation is to be performed. When the signal $\overline{OUTPUT}$ drops to the low level the driver chip 610 produces the signal I/O WR which is applied to a second input of NOR 612. Therefore, upon occurrence of either $\overline{INPUT}$ or $\overline{OUTPUT}$ the signal I/O RD or WR at the output of inverter 614 rises to the high level.

The signal I/O RD is also applied to one input of a NAND 616. The signal SST 2 is applied to a second input of NAND 616 and its output is connected to the NOR 608. The output of NOR 608 is connected to AND 604 which in turn has its output connected to one input of NOR 618. The output of NOR 618 is the low level signal $\overline{LOAD\ DATA\ REG}$.

The signals LD RD DATA and LD WR DATA are applied to second and third inputs of NOR 618. The fourth input to NOR 618 is connected to the output of an AND 622.

The signal $\overline{SDC\ BUSY}$ comes from the SDC control bus 210 and is at a low level during data transfer time only when an SDC 122 is busy. The signal $\overline{SDC\ BUSY}$ is applied to an inverter 624 having its output connected through an inverter 626 one input of AND 622. AND 622 also receives the output of an AND 628. AND 628 receives the signal I/O WR from driver chip 610 and is further conditioned by a $\phi1A$ clock pulse. The signal SST 1 is applied to another input of AND 622 hence the output of AND 628 may pass through AND 622 only during sequential state SST 1 if the addressed SDC is not busy.

The signal I/O RD from driver chip 610 is applied to one input of an AND 630. AND 630 is further connected to receive the signals READ PULSE and SST 3. The output of AND 630 is connected to one input of a NOR 632 and the output of NOR 632 is the signal $\overline{ENABLE\ DATA\ DRV}$. The signal $\overline{ENABLE\ DATA\ DRV}$ may also be produced by a combination of signals applied to a NOR 636 and an AND 638. NOR 636 receives the signals $\overline{INT\ SEQ\ EN\ FF}$ and READ. The output of NOR 636 is applied to one input of AND 638. The second input of AND 638 receives the signal BUS GRANTED and the output of AND 638 is connected to a second input of NOR 632.

The output of inverter 624 is the signal DC BUSY-A and it is applied to one input of an AND 640. The signal READ is applied to a second input of AND 640 and the output of the AND is connected to one input of a NOR 642. The output of NOR 642 is passed through an inverter 644 to become the signal DRIVE SDC BUS. NOR 642 also has an input connected to the output of an AND 648. AND 648 has three inputs connected to receive the signal GO FF on lead 426, the output signal from inverter 626, and the signal I/O WR from the driver chip 610.

The signal $\overline{PIN}$ on lead 286 is applied to the SDC control bus 210 and defines the direction of data flow. When it is at the low level, data is being sent from the SDC to the SDMA under control of the FALT and FACK signals. When the signal $\overline{PIN}$ is at the high level the direction of data transfer is defined as being from the SDMA to the SDC. The signal $\overline{PIN}$ is derived as follows. An AND 650 has one input connected to the output of inverter 626 and a second input connected to receive the signal I/O RD from driver chip 610. The output of AND 650 is connected to one input of an AND 652. AND 652 has a second input connected to receive the signal GO FF. The output of AND 652 is applied to one input of a NOR 654. The signal INT SEQ EN FF is applied to both inputs of an AND 656 and the output of this AND is applied to the second input of NOR 654.

An interrupt request flip-flop 658 and a bus request flip-flop 660 are shown in FIG. 6. Both of these flip-flops are D-type flip-flops having their clocking inputs connected to receive the clock signal φ3A. Both flip-flops have a reset input which is connected to receive the signal $\overline{\text{BUS GRANTED}}$. An AND 606 receives the signal IST 2 as well as the DFACK output from inverter 600. The output of AND 606 is a signal INTERRUPT REQUEST. This signal is applied to the D input of flip-flop 658 so that the flip-flop is set at the beginning of φ3A when an interrupt is requested.

The bus request flip-flop is set as follows. The signal READ is applied to one input of an AND 662. This AND receives the signal DREQ A and $\overline{\text{DISABLE BREQ}}$ at second and third inputs. The output of AND 662 is connected to one input of a NOR 664. An AND 666 has three inputs for receiving the signals $\overline{\text{END MEM OP FF}}$, DR LD FF, and D WRITE A. The output of AND 666 is connected to a second input of NOR 664. The output of NOR 664 is connected through an inverter 668 to the D input of the bus request flip-flop 660 so the flip-flop is set at φ3A if the output of inverter 668 is at the high level. The set output of flip-flop 660 is connected through an inverter 670 to become the signal $\overline{\text{BUS REQUEST}}$.

FIG. 7 shows the circuits for producing the clock pulses as well as certain ones of the drivers and receivers connected to the SDC control bus 210 for the purpose of generating and receiving the "handshaking" signals required in transfers between the SDMA and the SDC's.

The clock pulse φ1A–φ4A are generated by the CPU 100 and applied over the system control bus 204 to a set of 3-state drivers 700 in each SDMA. Each clock pulse has a duration of 62.5 nanoseconds and the time between successive pulses of the same phase is 500 nanoseconds. The driver chip 700 is permanently enabled, hence when any driver receives a low level signal it produces a logic one output signal. The outputs from the drivers 700 are designated φ1A–φ4A. In addition, the signal φ2A is passed through two inverters 702 and 704 to become the signals $\overline{\text{φ2AS}}$ and $\overline{\text{φ2AD}}$. This latter signal is applied to all of the SDC's 122 by way of the SDC control bus 210. In addition, the signal φ4A is passed through a 3-state driver in a driver chip 706 to generate the signal φ4AD which is also applied over the SDC control bus to the SDC's. With these exceptions, all output signals derived from the driver chip 700 are employed within the SDMA itself.

The signal $\overline{\text{SALT}}$ on lead 285 is connected through the SDC control bus 210 to each of the SDC's. When the $\overline{\text{SALT}}$ signal drops to the low level, it provides an indication to all of the SDC's that the SDMA is presenting the address of one of them on the SDC address bus 208. $\overline{\text{SALT}}$ remains active until the addressed SDC recognizes its address and responds with a select acknowledge (SACK) signal. $\overline{\text{SALT}}$ is generated as follows. A NAND 716 has three inputs connected to receive the signals SST 1, SELECTION, and $\overline{\text{STEP ON}}$. The output of NAND 716 is the signal $\overline{\text{EN SALT X}}$ and this signal is applied to one input of a NOR 718. A second input of NOR 718 receives the signal $\overline{\text{IST 1}}$. The output of NOR 718 is connected to both the D and the reset inputs of a D-type flip-flop 720. The set output of the flip-flop is applied to an inverter 722 and the output of this inverter is the signal $\overline{\text{SALT}}$. A φ3A clock pulse is applied to flip-flop 720, hence the flip-flop is set at the beginning of φ3A if the output of NOR 718 is at the high level. If the output of NOR 718 drops to the low level then flip-flop 720 is reset immediately.

After the SDC's receive the signal $\overline{\text{SALT}}$ and one of them recognizes its address on the SDC address bus, the recognizing SDC drops the signal $\overline{\text{SACK}}$ to the low level. This signal is passed through an inverter 724 to become the signal D SACK. The D SACK signal is employed in FIG. 5 to advance the sequential state logic circuits thus terminating either the signal SST 1 or $\overline{\text{IST 1}}$ depending upon the type of operation being performed. This will cause the output of NOR 718 to drop to the low level so that the flip-flop 720 is reset and the $\overline{\text{SALT}}$ signal terminated.

The output of inverter 724 is also applied to the reset input of a D-type flip-flop 728, and is passed through an inverter 730 to generate the signal $\overline{\text{D SACK}}$.

The purpose of the flip-flop 728 is to signal an active SDC that a memory parity error or address error occurred during a memory operation. If one of these errors occurs then the memory circuits drop an appropriate signal on the system control bus 204 to the low level. If an addressing error occurs the signal $\overline{\text{MEM ADR ERR}}$ drops to the low level to enable a NOR 732. On the other hand, if a memory parity error occurs then the low level signal $\overline{\text{MEMPAR ERR}}$ is applied to NOR 732. The output of NOR 732 is connected to one input of a NAND 734 and the second input of the NAND receives a φ2A clock pulse. The output of NAND 734 is applied to the clock input of flip-flop 728 and sets the flip-flop provided the signal BUS GRANTED is at the high level thereby indicating that an SDC associated with this SDMA is communicating with the memory. The set output of flip-flop 728 is applied to one of the 3-state drivers 706 to generate the low level signal $\overline{\text{MEM CHECK}}$. This signal is sent to the active SDC to terminate its operation. When the SDC terminates the operation the signal $\overline{\text{SACK}}$ rises to the high level and the flip-flop 728 is reset.

The signal $\overline{\text{FALT}}$ is a control signal transmitted from the SDMA to an SDC that has already been selected. When the signal $\overline{\text{FALT}}$ is at the low level it informs the selected SDC that the information available on the SDC data bus should be acted on. The signal $\overline{\text{FALT}}$ is terminated after the SDC acts on the information and returns to the SDMA an acknowledge signal designated FACK. The signal $\overline{\text{FALT}}$ is generated as follows. The output of inverter 724 is connected to one input of a NAND 736. NAND 736 further receives the signals $\overline{\text{STEP ON}}$ and SST 2. The output of NAND 736 is connected to one input of a NOR 738. The signal $\overline{\text{IST 2}}$ is applied to a second input of NOR 738 and the output of the NOR is connected to the D input of a D-type flip-flop 740. The flip-flop is clocked by φ3A pulse so the flip-flop is set on φ3A if the output of NOR 738 is at the high level. The set output of flip-flop 740 is connected to one of the drivers in the chip 706 and the output of this driver is the low level signal $\overline{\text{FALT}}$. Flip-flop 740 is reset when the output signal from NOR 738 drops to the low level.

A JK flip-flop 750 has its set output connected to one of the drivers on chip 706 for the purpose of producing the signal $\overline{\text{DACK}}$. DACK is a data acknowledge control signal which is sent from the SDMA to a selected SDC for the purpose of acknowledging a data request. If a data write signal was active at the time the data request was received from the SDC, then $\overline{\text{DACK}}$ informs the SDC that the character on the SDC data bus has been written into the data register of the SDMA. If a data read signal was active at the time the data request was received from the SDC, then $\overline{\text{DACK}}$ informs the SDC that the SDMA has a byte on the SDC data bus ready for acceptance by the SDC. The particular details of these operations will become clear when specific examples of certain operations are considered.

A D-type flip-flop 752 has its clock input connected to receive the signal DR LD FF. The set output of the flip-flop is connected to the J and $\overline{\text{K}}$ inputs of flip-flop 750 and produces the signal DISABLE BREQ which appears on lead 754. Flip-flop 750 is clocked with a $\phi$3A clock signal and both flip-flops 750 and 752 are reset as the signal DREQ A applied to their reset inputs drops to the low level. While flip-flop 750 is reset it generates the high level signal $\overline{\text{DACK FF}}$ and while flip-flop 752 is reset it generates the high level signal $\overline{\text{DISABLE BREQ}}$. When the signal DR LD FF rises to the high level it sets flip-flop 752. At the next following $\phi$3A the output of flip-flop 752 sets flip-flop 750 and the output of this flip-flop drives one of the drivers on chip 706 to produce the low level signal $\overline{\text{DACK}}$. Both flip-flops are reset by the signal DREQ A.

In FIG. 8 the signal $\overline{\text{DREQ}}$ from the SDC control bus is passed through an inverter 800 to become the signal DREQ A. A selected SDC drops $\overline{\text{DREQ}}$ to the low level to make a data request to the SDMA. The output of inverter 800 is also applied to one input of an AND 804 and a NAND 806. The signal $\overline{\text{D WRITE}}$ from the SDC control bus is passed through an inverter 808 to become the signal D WRITE A. $\overline{\text{D WRITE}}$ is generated by an SDC throughout an interval the SDC is transferring bytes of data to the memory. The D WRITE A signal is applied to a second input of NAND 806 as well as one input of two further AND's 812 and 814. AND 812 receives the signal $\overline{\text{DACK FF}}$ at a second input if the DACK flip-flop 750 is reset. Thus, if the DACK flip-flop is reset and the signal $\overline{\text{D WRITE}}$ is at the low level, AND 812 is conditioned to produce a high level output signal to AND 704. When $\overline{\text{DREQ}}$ drops to the low level the output of inverter 800 enables the second input of AND 804. If the data register load flip-flop 816 is reset at this time it is enabling the third inputs of AND 804 so the AND produces a high level output signal to the J input of flip-flop 816. The output of AND 804 is the signal LOAD WRITE DATA. The clock signal $\phi$1A is applied to an inverter 821 and the output of the inverter is applied to the clock input of flip-flop 816, hence the flip-flop is set at the end of the $\phi$1A clock signal if the output of AND 804 is at the high level to indicate that the data on the SDC data bus has been loaded to the SDMA data register. When the flip-flop is set the signal DR LD FF rises to the high level while the signal $\overline{\text{DR LD FF}}$ drops to the low level.

Flip-flop 816 may also be set for operations involving the transfer of data from memory through the SDMA to an SDC. The output of inverter 808 is passed through a further inverter 822 to become the signal READ. The READ signal is applied to one input of an AND 826. $\overline{\text{MEM ACK}}$ is a signal placed on the system control bus by the memory to indicate that data from the memory is on the data bus and may be strobed into the SDMA data register. $\overline{\text{MEM ACK}}$ is applied to a driver in the 3-state driver chip 828 and when $\overline{\text{MEM ACK}}$ is active the output of the driver enables a second input of AND 826. AND 826 is further enabled by the signal BUS GRANTED which is derived from a 3-state driver chip 830. BUS GRANT is a control signal placed on the system control bus by the bus manager in response to a bus request by the SDMA and indicates to the SDMA that it has control over the system bus. $\overline{\text{BUS GRANT}}$ is applied to a driver in the chip 830 and when it drops to the low level the chip produces a high level output signal BUS GRANTED on lead 832. This latter signal is connected back to the input of a further driver within the chip 830 so that this driver simultaneously produces the low level signal $\overline{\text{BUS GRANTED}}$. The BUS GRANTED signal enables AND 826 when it is at the high level so AND 826 may produce the high level signal LOAD RD DATA on lead 836. The output of AND 826 is passed through an inverter 838 to set flip-flop 816 thereby indicating that the byte of data on the system data bus has been stored in the SDMA data register.

When $\overline{\text{DREQ}}$ rises to the high level after each data request on a read operation, $\overline{\text{D WRITE}}$ is at the high level AND 806 produces a high level output signal that is applied through a NOR 840 to reset flip-flop 816.

The flip-flop 816 is also reset by the signal END MEM OP FF from flip-flop 842 during a WRITE operation. The signal MEM ACK on lead 837 is applied to the J and $\overline{\text{K}}$ inputs of flip-flop 842 and the set output of the flip-flop is connected to one input of AND 814. The AND is further enabled by the output from inverter 808 and the $\phi$2A clock pulse. The inverted $\phi$1A clock pulse is applied to the clocking input of flip-flop 842, hence the flip-flop is set at the end of $\phi$1A if the signal MEM ACK is at a high level. AND 814 then produces an output signal that is passed through NOR 840 to the reset input of flip-flop 816. Flip-flop 842 is also reset when the signal $\overline{\text{BUS GRANT}}$ is terminated and the lead 832 drops to the low level.

When flip-flop 842 is reset, it produces the high level signal $\overline{\text{END MEM OP FF}}$. In addition, the low level signal from the set output enables one input of a NAND 844. This NAND is further enabled when the signal $\overline{\text{EN DATA ADR}}$ drops to the low level. The output of NAND 844 is the high level signal MEM OP. This signal is passed through an inverter 846 to become the signal $\overline{\text{BUS BUSY}}$. The $\overline{\text{BUS BUSY}}$ signal is transmitted over the system control bus to the bus manager to inform the bus manager that the SDMA has accepted control of the bus in response to the $\overline{\text{BUS GRANT}}$ signal.

The signal $\overline{\text{PWR ON CLR}}$ is automatically generated when the CPU is turned on. It is a 500 millisecond pulse that is transmitted over the system control bus to each of the SDMA's. In each SDMA it is applied to a NOR 850. The output of NOR 850 is the signal SDMA RESET. It is passed through NOR 840 to reset flip-flop 816. In addition, SDMA RESET is passed through an inverter 854 to become the signal $\overline{\text{SDMA RESET}}$. The signals $\overline{\text{SDMA RESET}}$ and SDMA RESET are applied to various ones of the flip-flop and counters in the SDMA for the purpose of resetting or clearing them when the power is turned on. A similar function is accomplished when the operator depresses a reset key on the control panel. This generates the signal $\overline{\text{RESET}}$ which is applied to the second input of NOR 850 and results in the generation of the same signals as the $\overline{\text{PWR ON CLR}}$. In addition, the signal $\overline{\text{RESET}}$ is passed through inverters 858 and 860 to become the signal $\overline{\text{S RESET}}$. This latter signal is applied over the SDC control bus 210 for the purpose of resetting each of the SDC's 122.

TYPICAL OPERATIONS

It takes a combination of one input and three output instructions from the CPU 100 to set up an SDMA and an SDC connected to that SDMA so that data may be transferred between the memory 102 and the SDC. This is true regardless of the direction in which the transfer of information is to take place. During the set-up sequence the CPU generates an input instruction followed by three output instructions. In the following description it will be assumed that the operation to be performed is the transfer of one line of data (132 bytes) from the memory to a line printer connected to the SDMA having the address 101 for the purpose of printing that line of data. The operations performed during each of these set-up sequence instructions are described below in separate sections. Generally speaking, the input instruction addresses the status register in a specific SDC 122 serviced by a specific SDMA 108. If the SDMA is busy its status is returned to the accumulator in the CPU. If the SDMA is not busy then the status of the addressed SDC is reported back to the accumulator. Assuming that the addressed SDC is connected to the system, is turned on, and is not busy, the CPU issues the first output instruction and places on the system address bus an address having the format shown in FIG. 10C. The SDMA responds to this output instruction by loading the lower half of the address pointer counter 232 with the data byte in the CPU accumulator. The CPU then executes another output instruction and places another address having the format shown in FIG. 10B on the system address bus. In response to this second output instruction, the SDMA loads the data byte on the system data bus into the upper half of the address pointer counter 232. Finally, the CPU executes a third output instruction and sends a command to the selected SDC. An address on the system address bus identifies which register is to receive this command. Under the assumed conditions, this command is a print command, hence the address appearing on the system address bus has the format shown in FIG. 10E. After this third output instruction has been executed, the CPU returns to its normal program and the SDMA controls the actual transfers of the data bytes from the memory to the selected SDC by means of the address contained in the address pointer counter. During the actual transfer of data, the SDMA must compete with other units connected to the system bus for access to the memory. Thus, for each byte transferred the SDMA must make a bus request and after the SDMA is given access to the memory the bus manager responds with a BUS GRANT signal. After the data transfer operation is completed the SDC generates an interrupt request to the SDMA in order to report its status, i.e., it has loaded its buffer register and initiated a print cycle. The SDMA is now free to service another SDC. After the printer prints the line of data its SDC will make another interrupt request to the SDMA, this time to report to the CPU that it is now in a status to accept further data. Each of the input and output instructions employed to set up a transfer operation will not be considered separately in detail.

Input Instruction

Figure 9:
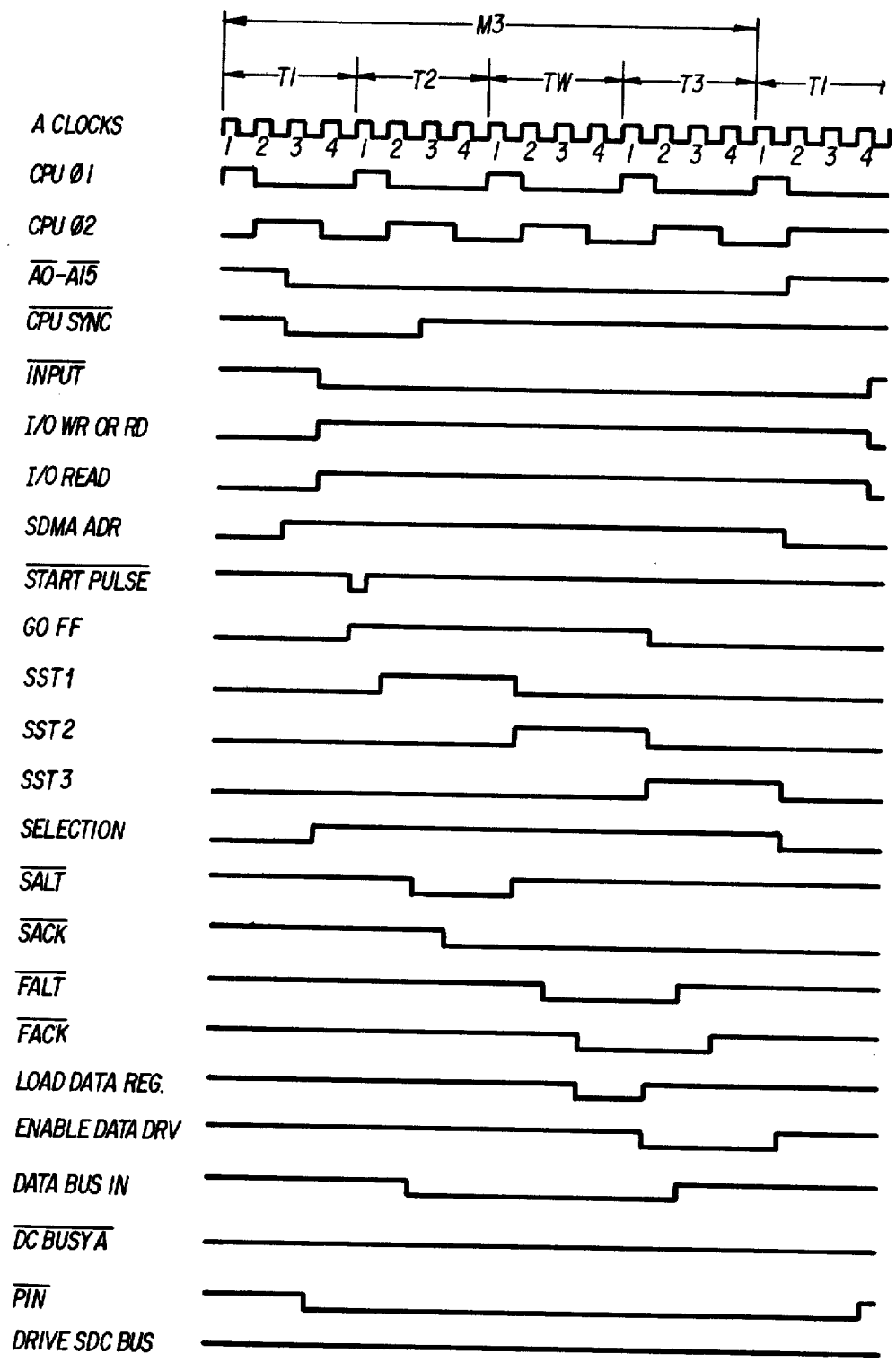
FIG. 9 is a waveform diagram illustrating the timing of various signals occurring within the shared direct memory access controller during an input instruction.

If the CPU 100 is an Intel 8080, it takes three machine cycles of the CPU to execute an input instruction. During the first two machine cycles the instruction is read out from storage and decoded. At the first $\phi$3A of the third machine cycle M3 (See FIG. 9) an address, which should have the format shown in FIG. 10D, is placed on the system address bus 202. At the same time, the CPU drops the signal $\overline{\text{CPU SYNC}}$ to the low level. In FIG. 4, NAND 408 recognizes the combination of bits in A7-A5 as being the address of the SDMA. The output of NAND 408 enables one input of NAND 412 which has a second input enabled by the output of inverter 418. The output of NAND 408 also enables one input of NAND 416.

At $\phi$4 the CPU places on the control bus the low level signal $\overline{\text{INPUT}}$. This signal passes through a 3-state driver 610 to generate I/O READ thereby enabling a second input of NAND 416. Since both of the address bits A4 and A3 are zeros, NAND 458 produces an output signal to further enable NAND 416. The output of NAND 416 passes through inverter 417 to generate the signal SELECTION. The SELECTION signal is applied to NAND 716 but the NAND is blocked at this time because the signal SST 1 is at the low level.

The I/O READ signal generated by driver 610 passes through NOR 612 and inverter 614 to drive the signal I/O RD or WR to the high level. This latter signal further enables NAND 412 so at the next $\phi$1A NAND 412 produces the signal $\overline{\text{START PULSE}}$. $\overline{\text{START PULSE}}$ immediately sets the GO flip-flop 424 thereby generating the signals GO FF and $\overline{\text{NOT READY}}$. $\overline{\text{NOT READY}}$ is transmitted back to the CPU to stop the CPU in its third machine cycle of the input instruction. This effectively places the CPU in a wait state and during this wait state the address remains on the system address bus and the signal $\overline{\text{INPUT}}$ is maintained on the control bus.

When the GO flip-flop is set, the signal $\overline{\text{GO FF}}$ is applied to NAND 542. This blocks NAND 542 through which all interrupt requests from the SDC's must be passed to set the flip-flop 532. This insures that no SDC is able to initiate an interrupt request while the SDMA is busy processing the input instruction.

The signal GO FF passes through MUX 506 and enables counter 510 so at $\phi$2A the counter is incremented and the output of the counter is applied to decoder 514 to produce the signal SST 1.

SST 1 is applied to NAND 716 which is already receiving the high level signal SELECTION. The signal $\overline{\text{STEPON}}$ is also at the high level at this time provided, as subsequently explained, the SDMA was not busy at the time $\overline{\text{START PULSE}}$ was generated. The output of NAND 716 passes through NOR 718 and at $\phi$3A flip-flop 720 is set to produce the signal $\overline{\text{SALT}}$.

$\overline{\text{SALT}}$ is applied to all of the SDC's 122 over the SDC control bus to alert the SDC's to the fact that the address of one of them is present on the SDC address bus. The address was placed on the SDC address bus at the same time it appeared on the system address bus. From the system address bus, the address bits pass through inverters 400-404 to MUX 406 and AND 405. Since the interrupt sequence enable flip-flop is reset at this time, bits A4-A1 are gated through MUX 406 and bit A0 is gated through AND 405 and NOR 407 to become the address bits $\overline{\text{RSL 4}}$-$\overline{\text{RSL 1}}$ on the SDC address bus. Also, when the signal I/O READ was generated it passed through AND 650 to enable AND 652, and when the GO flip-flop 424 was set the signal GO FF passed through AND 652 and NOR 654 to become the signal $\overline{\text{PIN}}$ which is applied over the SDC control bus to all of the SDC's 122.

PIN tells all of the SDC's that a transfer is to take place from one of the SDC's to the SDMA while SALT tells all of the SDC's to compare address bits RSL 1 and RST 0 with its own address. The SDC which recognizes bits RSL 0 and RSL 1 as its own address will connect itself to the SDC bus and within 250 nanoseconds generate the signal SACK thereby acknowledging to the SDMA that it is connected.

At the first φ4A clock pulse after the SDMA generates the signal SALT the addressed SDC generates the low level signal SACK and this signal is passed over the SDC control bus to the SDMA where it passes through inverters 724 and 730 to generate the signals D SACK and D SACK. The signal SACK remains active until the end of the data transfer operation which will be set up by the present input instruction and the following three output instructions. After the data transfer operation is completed the SDC will terminate the SACK signal to deselect itself.

The signal D SACK is passed through NOR 544 to block NAND 542. This insures that no interrupt request from other SDC's will be honored even after the GO flip-flop is reset near the end of the present input instruction cycle. The signal NAVAIL produced by NOR 544 is passed through NOR 438 to enable the busy flipflop 422. The flip-flop is not set at this time and will be set only if an attempt is made to start another selection sequence to a different SDC while the SDMA is connected to a first SDC.

The signal D SACK is passed through MUX 506 and at the first φ2A after SACK becomes active, counter 510 is advanced to a count of two and the output of the counter activates the decoder 514 to produce the signal SST 2. SST 1 is terminated at this time and the output of NAND 716 resets flip-flop 720 through NOR 718 to terminate SALT.

SST 2 and D SACK enable NAND 736 which is further enabled by the signal STEP ON which is at a high level. The output of NAND 736 passes through NOR 738 to enable the Function Alter flip-flop 740. At φ3A the flip-flop is set thereby causing a drivers 706 to produce the low level signal FALT (Function Alert). The signal FALT is placed on the SDC control bus and is accepted by the SDC which was selected during SST 1. FALT tells the selected SDC that is should again look at the address on the SDC address bus, this time examining the function identifying bits RSL 4-RSL-2. Since all of these bits will be zeros (FIG. 10D) the SDC recognizes this as requiring that its status be placed on the SDC data bus.

The selected SDC decodes RSL 4-RSL 2 and reads out its status register onto the SDC data bus 206 and the status is applied to MUX's 300 and 301 as the data bits. The status is reported as one of four hexidecimal values 00, 80, 90 or 40.

If there is no SDC connected to the SDMA having an address corresponding to that placed on the SDC address bus, then the status value 00 indicates that the addressed SDC is non-existent. In this case there is no actual readout of the status from the status register and the SDC. In this case the SDMA will generate the status bits as subsequently described.

If the addressed SDC is busy performing another task it reports the status value 80. If the addressed SDC is connected to a SDC bus, but is not on-line, it reports the status value 90. Finally, if the addressed SDC does exist, is on-line and connected, and is available to proceed with another operation, it reports the status value 40.

Shortly after the status value is applied to the data register multiplexers 300 and 301, and at φ4A following the generation of the FALT signal by the SDMA, the SDC generates the signal FACK (Function Acknowledge) to tell the SDMA that the SDC has placed its status on the SDC data bus. FACK passes through inverter 600 to become the signal D FACK. D FACK enables one input of AND 604. The signals I/O READ and SST 2 are both high so the output of NAND 616 passes through NOR 608 to condition AND 604. Therefore, when D FACK occurs AND 604 produces an output signal that passes through NOR 618 to become the signal LOAD DATA REG. This latter signal is applied to the clock inputs of MUX's 300 and 301 and, since the signal DRIVE SDC BUS is high at this time because all inputs to AND 648 are high, the status bits S7-S0 are gated into the data register.

As soon as the status is entered into the data register it is made available to the data bus drivers 314. The signal STEP ON is at the high level so the low level output of NAND 310 is applied to the select inputs of MUX's 302 and 303. This selects the A inputs which are receiving the status data that has been latched into the latches in the data register MUX's 300 and 301. The status is not placed on the system data bus at this time because the drivers 314 are not enabled.

The D FACK signal is passed through MUX 506 to enable counter 510, and at the next φ2A the counter is advanced so that decoder 514 produces the signal SST 3. SST 3 immediately resets GO flip-flop 424 thereby terminating the signals GO FF and NOT READY. In FIG. 7, SST 2 drops to the low level when SST 3 begins, hence the output of NAND 736 passes through NOR 738 to reset the function alert flip-flop and terminate FALT. This in turn causes the selected SDC to terminate the signal FACK.

The signal SST 3 is applied to AND 630 which is further enabled at this time by the signals I/O READ and READ PULSE. The output of AND 630 passes through NOR 632 and enables the 3-state drivers 314 so that the status is gated onto the system data bus. The status byte passes into the accumulator within the CPU 100.

When the signal NOT READY rises to the high level at the beginning of SST 3, it terminates the wait state of the CPU 100 and the execution of the input instruction is resumed so that the status on the data bus may be gated into the accumulator. Shortly thereafter, the CPU terminates the signal DATA BUS IN, thereby acknowledging receipt of the data and the output of inverter 500 passes through NOR 504 and MUX 506 to enable the counter 510. At the next φ2A the counter is advanced thereby returning it to the zero state and terminating the SST 3 output from decoder 514. This completes the response of the SDMA to the input instruction. The CPU now analyzes the status it has received from the SDMA and determines what steps to take in response to the reported status.

First Output Instruction

Figure 11:
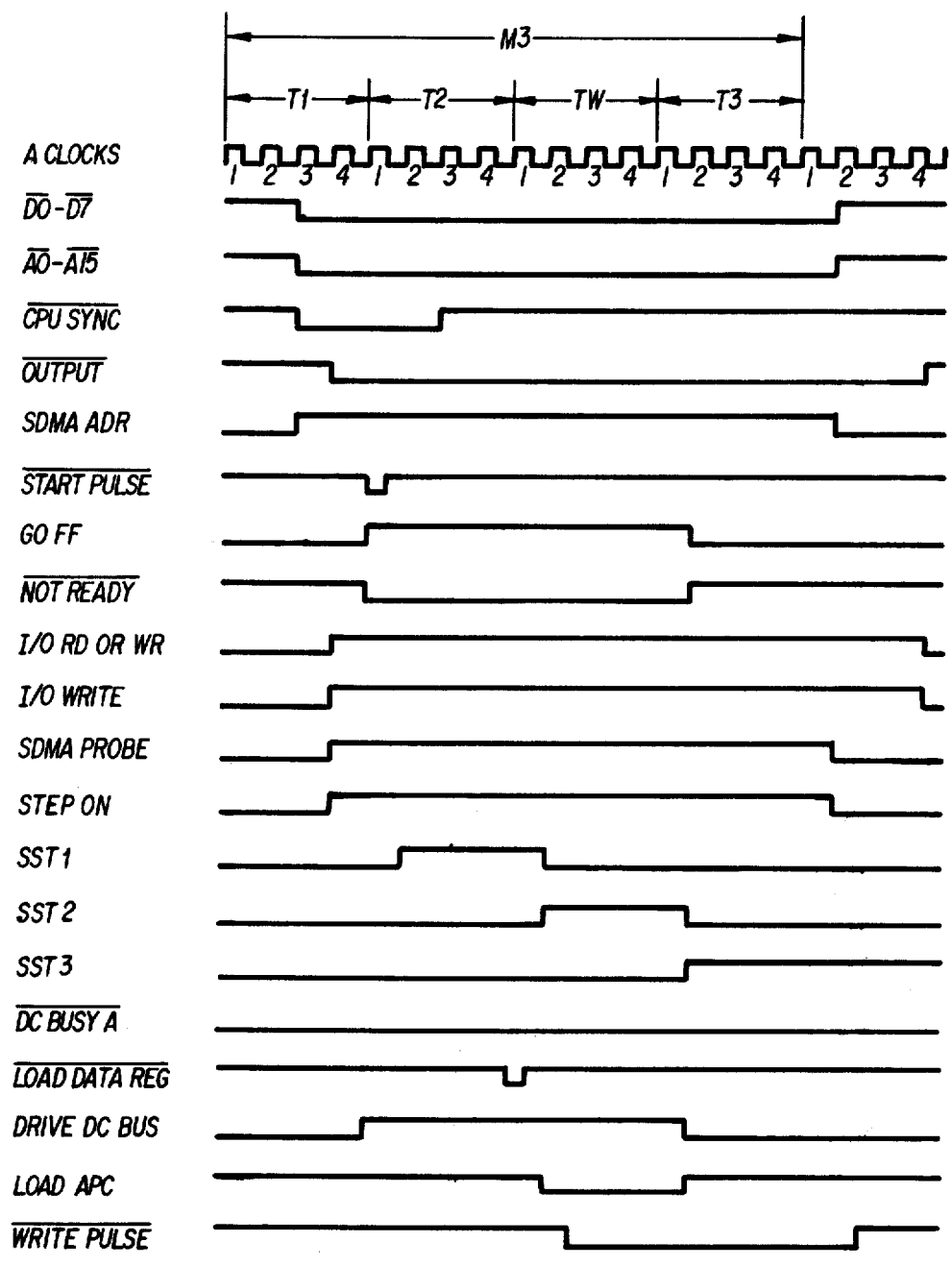
FIG. 11 is a waveform diagram illustrating the timing of various signals occurring during execution of the output instructions which load the address pointer counter; and, FIGS. 12A and 12B are waveform diagrams illustrating the timing of various signals during output and input data transfers, respectively.

Assuming that the SDMA sent the status value 40 to the CPU thereby indicating that the SDMA and the addressed SDC are both ready to receive further instructions, the CPU begins execution of an output instruction and loads its accumulator with a byte of data representing the eight least significant bits of a memory address. This address is the address of the first memory location where data will be written or read once the SDMA and SDC have been set up and the actual data transfer begins. Referring to FIG. 11, at the first φ3A of the third CPU machine cycle (M3) during which the output instruction is being executed, the contents of the CPU accumulator are gated onto the system data bus and applied to the B inputs of data register multiplexers 300 and 301. At the same time, the CPU places on the system address bus an address having the format shown in FIG. 10C and begins generation of the signal $\overline{\text{CPU SYNC}}$. NAND 408 recognizes address bits A7–A5 as being the address of this SDMA and produces the signal SDMA ADDRESS to enable NAND's 412 and 414. At φ4A the CPU generates the low level signal $\overline{\text{OUTPUT}}$ which is passed through a driver 610 to become the signal I/O WRITE. I/O WRITE passes through NOR 612 and inverter 614 to generate I/O RD or WR.

At φ1A, the GO flip-flop 424 is set by the output of NAND 412 and the signals GO FF and $\overline{\text{NOT READY}}$ are generated in the same manner as for the input instruction.

The address bits A4–A0 pass through inverters 400–404 and 411 to generate the signals $\overline{\text{RADR 4}}$ and RADR 4-RADR0. The signal RADR 0 is applied to decoder 318 but the decoder is not enabled at this time. The signals RADR 1, RADR 2, RADR 3, and $\overline{\text{RADR 4}}$ are all applied to NAND 452 which recognizes these four address bits as being the address of the address pointer counter. The output of NAND 452 conditions NAND 414 which is receiving the signals I/O READ or WRITE and SDMA ADR at this time. NAND 414 produces a low level output signal that passes through inverter 454 to become the high level signal SDMA PROBE. SDMA PROBE is applied to NAND 316 which is further enabled by I/O WRITE but the NAND is blocked at this time because the signal SST 2 is at the low level.

SDMA PROBE is also applied to NAND 310. The resulting low level output from NAND 310 is applied to the select inputs of MUX's 302 and 303 thus selecting the output of the data register for application to the counters 320–323.

The output of NAND 414 is passed through NOR 448 thus driving the signal STEP ON to the high level while dropping $\overline{\text{STEP ON}}$ to the low level. STEP ON is applied to the A2 and D5 inputs of MUX 506. Since the counter 510 is standing at zero at this time, the STEP ON signal applied to the A2 input of MUX 506 selects the D4 input. This gates the signal GO FF through MUX 506 to the counter 510 and at φ2A the counter is advanced to a count of one. The output of the counter is decoded by decoder 514 to generate SST 1.

In FIG. 6, SST 1 enables one input of AND 662 which is further enabled by the high level signal $\overline{\text{DC BUSY A}}$. AND 628 is enabled by I/O WRITE and at φ1A after SST 1 goes high the output of AND 628 passes through AND 622 and NOR 618 to generate the signal $\overline{\text{LOAD DATA REG}}$. Since the signal DRIVE DC BUS is at the high level, this loads the data byte on the system data bus into the data register MUX's 300 and 301. Since the signal SDMA PROBE is causing the output of NAND 310 to select the A inputs of MUX's 302 and 303, the byte of data loaded into the data register is immediately gated through to the counters 320–323. However, the data is not entered into the counters at this time.

At this time, counter 510 contains the count of one and the signal STEP ON is at the high level. The combination of these two signals selects the D5 input of MUX 506 so that the STEP ON signal is gated through MUX 506 to enable counter 510. At φ2A the counter is incremented to the value two and the output of the counter is decoded by decoder 514 to produce the signal SST 2.

In FIG. 3, SST 2 enables NAND 316 and since the other inputs of the NAND are at the high level at this time it produces a low level output signal to enable decoder 318. The decoder is receiving the high level signals $\overline{\text{DC BUSY A}}$ and RADR 0 at this time, hence it produces a low level output signal to enable the loading of counters 320 and 321. At this time the counters 320 and 321 are loaded with the byte of data that has been held in the data register.

During the entire output operation the signal DISABLE BREQ is at a low level thus blocking AND 306. The low level output of AND 306 is passed through inverter 308 and applied to the D6 input of MUX 506. The signal STEP ON is still at the high level and during SST 2 the counter 510 contains a count of two, hence the signal ENABLE STEP is gated through MUX 506 to the counter 510. At φ2A the clock pulse increments the counter to a count of three and decoder 514 decodes this value to generate the signal SST 3.

SST 3 resets the GO flip-flop 424 thus terminating the signals GO FF and $\overline{\text{NOT READY}}$. $\overline{\text{NOT READY}}$ is sent back to the CPU where it terminates the wait state and the CPU resumes execution of the output instruction. The CPU subsequently terminates the signal $\overline{\text{WRITE PULSE}}$ so the inverter 508 applies a low level input signal to NOR 504. The NOR is receiving a low level signal at its other input at this time, hence a high level output from NOR 504 passes through MUX 506 to enable counter 510. At the first φ2A of the next machine cycle (M1) counter is advanced by a clock pulse thereby resetting it to the zero state. This concludes the output operation for loading the lower half of the address pointer counter.

SECOND OUTPUT INSTRUCTION

After the output operation just described has been completed, the CPU executes another output instruction for the purpose of loading the upper half of the address pointer counter. This instruction is executed in exactly the same manner as the previous output instruction with one exception. The address placed on the system address bus has the format shown in FIG. 10B. Since bit A0 is a zero inverter 400 produces the low level signal RADR 0 which is applied to the decoder 318. The low level signal RADR 0 in combination with the high level signal $\overline{\text{DC BUSY A}}$ causes the decoder 318 to produce a low level output signal at terminal 2 to thereby enable the load terminals of the two high order counters 322 and 323. Thus, the data byte from the accumulator is passed through the data register and through MUX's 302 and 303 to enter the high order counters 322 and 323.

With respect to both the first and second output instructions, it should be noted that no handshaking is required with the selected SDC since all communication during these two output instructions is between the CPU and the SDMA itself. During SST 1 the low level signal $\overline{\text{STEP ON}}$ blocks NAND 716 to prevent the setting of flip-flop 720 and generation of the signal SALT. During SST 2, $\overline{\text{STEP ON}}$ blocks NAND 736 to prevent the setting of flip-flop 740 and the generation of the signal $\overline{\text{FALT}}$. Since $\overline{\text{FALT}}$ is not generated, the SDC will not generate the signal FACK. However, the SDC will still be producing the signal SACK which was rendered active during the execution of the input instruction.

THIRD OUTPUT INSTRUCTION

After the two output instructions are executed to load the address pointer counter, the CPU executes a third output instruction which actually provides the command which tells the SDC what function is to be performed. At the first $\phi$3A of the third machine cycle (M3) of the CPU, during execution of the output instruction, the CPU places on the system address bus an address having the format shown in FIG. 10E, and places on the system data bus a byte representing the actual command. For purposes of the present explanation, it is assumed that the one bit in A3 and the zero bit in A4 define the address of an SDC command register and that the byte on the data bus is 40, designating a print command. From the system address bus, the low order address bit passes through inverter 400, AND 405 now enabled, and NOR 407 to become the signal $\overline{RSL}$ 0 on the SDC address bus. Signals A1–A4 are passed through inverters 401–404 and MUX 406 to become the signals $\overline{RSL}$ 1-$\overline{RSL}$ 4 on the SDC address bus.

Address bits A5-A7 are recognized by NAND 408 and the output of the NAND enables one input of NAND 412. A second input of the NAND 412 is enabled by $\overline{CPU SYNC}$ which becomes active at the same time that the address bits are placed on the address bus. At the next clock pulse time, $\phi$4A, the signal $\overline{OUTPUT}$ drops to the low level so that driver 610 produces the signal I/O WRITE. This latter signal is passed through NOR 612 and inverter 614 to generate the signal I/O RD or WR.

I/O RD or WR enables a third input of NAND 412 and at the next $\phi$1A, NAND 412 generates the signal $\overline{START PULSE}$. $\overline{START PULSE}$ immediately sets flip-flop 424 to generate GO FF. GO FF is inverted at 428 to become the $\overline{NOT READY}$ signal that is sent back to the CPU for the purpose of placing it in the wait state as previously described.

The signal GO FF passes through MUX 506 to counter 510 and at $\phi$2A the counter is advanced to the count of one so that decoder 514 produces the signal SST 1.

During SST 1 the actual command, now present on the system data bus, is loaded into the data register. In FIG. 6, the signals I/O WRITE, GO FF, and $\overline{DC BUSY A}$ all condition AND 648 so that it produces an output signal that passes through NOR 642 and inverter 644 to produce the high level signal DRIVE SDC BUS. In FIG. 3, DRIVE SDC BUS enables NAND's 311 so that the output of MUX's 302 and 303 may be gated onto the SDC data bus. The signal DRIVE SDC BUS places the select input of data register MUX's 300 and 301 at the high level so as to select the B inputs of the MUX's which are connected to the system data bus. The signal $\overline{STEP ON}$ is at the high level and blocks NAND 310 thereby placing the select input of MUX's 302 and 303 at the low level whereby these MUX's are conditioned to receive the outputs from the data register MUX's 300 and 301. In FIG. 6, I/O WRITE enables AND 628 and at each $\phi$1A it produces an output signal to enable AND 622. $\overline{DC BUSY A}$ is at a high level and enables a second input of AND 622. SST 1 is applied to a third input of AND 622 so that $\phi$1A of SST 1 AND 622 produces an output signal that passes through NOR 618 to become the signal $\overline{LOAD DATA REG}$. This latter signal enables the clocking of the command on the system data bus into the data register latches 300 and 301. Immediately upon loading of the data register, its contents pass through MUX's 302 and 303 and the gates 311 to the SDC data bus.

The SDC which acknowledged its selection back during the input instruction has maintained its select acknowledge signal at the low level. $\overline{SACK}$ passes through inverter 724 to become the signal D SACK which enables the D1 input of MUX 506. With counter 510 containing a count of one, D SACK is passed through MUX 506 to enable counter 510 at $\phi$2A the counter is advanced to a count of two so that the decoder 514 terminates the signal SST 1 and initiates the signal SST 2.

During SST 2 the SDMA sends a $\overline{FALT}$ to the SDC to tell the SDC that there is valid data available for it on the SDC data bus. The signal SST 2 passes through NAND 736 and NOR 738 to enable flip-flop 740 and at the next following $\phi$3A the flip-flop is set to generate $\overline{FALT}$.

In response to $\overline{FALT}$ the SDC strobes the command on the SDC data bus into the register whose address is specified by the address on the SDC address bus. After it has strobed the command into the register, the SDC generates $\overline{FACK}$ as an acknowledge signal. In FIG. 6, $\overline{FACK}$ passes through inverter 600 to become the signal D FACK. In FIG. 5, D FACK passes through MUX 506 to counter 510 and at $\phi$2A the counter is advanced to a count of three thereby causing decoder 514 to terminate SST 2 and initiate SST 3. In FIG. 7 the termination of SST 2 causes flip-flop 740 to be immediately reset thereby terminating $\overline{FALT}$.

In FIG. 4, SST 3 resets the GO flip-flop 424 thereby terminating the signal $\overline{NOT READY}$. This enables the CPU to resume execution of the output instruction. The CPU then terminates the signal $\overline{WRITE PULSE}$ which is passed through inverter 508 to block NOR 504 and apply a signal through the D3 input of MUX 506 to the counter 510. At the next $\phi$2A the counter is advanced to return it to the zero state. This causes decoder 514 to terminate SST 3.

This concludes the sequence of instructions for setting up a data transfer between a selected SDC and the memory. The sequence includes an input instruction and three output instructions. During the input instruction, the SDC to be involved in the data transfer operation is selected and its status reported back to the CPU. During the first and second output instructions the address pointer counter in the SDMA is loaded with a value representing the first address in memory to be involved in the data transfer operation. Finally, during the third output instruction, a command is sent to the selected SDC to tell it what operation is to be performed. The CPU is now free to return to its program. The actual transfer of data between the selected SDC and the memory is accomplished by direct accessing of the memory with the address pointer counter in the SDMA.

DATA TRANSFERS

OUTPUT TRANSFERS

The selected SDC analyzes the command it received during the third output instruction of the set up sequence and determines what action should be taken in response to the command. Assume for purposes of explanation that the selected SDC controls a line printer capable of printing 132 characters per line. Assume further that the command instructs the SDC to load its buffer register from the memory with 132 bytes of data in preparation for a print operation. Referring to FIG. 12A, as soon as the SDC has analyzed the command it begins the data transfer operation by generating the low level signals $\overline{DREQ}$ and $\overline{SDC\ BUSY}$. $\overline{DREQ}$ will be generated for each byte to be transferred, but $\overline{SDC\ BUSY}$ will remain low throughout the data transfer operation. Since this is to be an operation involving a read from memory, the SDC maintains the signal $\overline{D\ WRITE}$ at a high level throughout the data transfer operation. In FIG. 8, these signals from the SDC cause the signals READ, DREQ A, and DC BUSY A to be at the high level while the signals D WRITE A and $\overline{DC\ BUSY\ A}$ are driven to the low level.

$\overline{SDC\ BUSY}$ is maintained at the low level throughout the data transfer operation for the purpose of preventing the inadvertent changing of the contents of the address pointer counter, or the inadvertent destruction of data in the data register if the CPU should happen to execute an output instruction while the data transfer operation is taking place. In FIG. 6, the low level signal $\overline{DC\ BUSY\ A}$ is applied to decoder 318, hence even if the decoder should receive an enabling input, its output would not select either the upper or the lower half of the address pointer counter. In FIG. 6, $\overline{DC\ BUSY\ A}$ disables AND's 622 and 648 to prevent $\overline{LOAD\ DATA\ REG}$ and DRIVE DC BUS from being generated if the SDMA senses an output instruction which would generate I/O WRITE at driver 610. Also, $\overline{DC\ BUSY\ A}$ blocks AND 650 to prevent generation of the signal $\overline{PIN}$ if the SDMA senses an input instruction which would cause the generation of I/O READ at drivers 610.

DC BUSY A and READ enable AND 640 and it produces an output signal that passes through NOR 642 and inverter 644 to generate the signal DRIVE SDC BUS. Because DC BUSY A and READ are both at the high level throughout the data transfer operation, DRIVE DC BUS selects the B inputs to the data register MUX's 300 and 301 and enables the NAND's 311. $\overline{STEP\ ON}$ blocks NAND 310 thereby conditioning MUX's 302 and 303 to pass the contents of the data register through to the NAND's 311, once the data register has been loaded.

When the SDC generates the first $\overline{DREQ}$ an inverter 800 produces a high level signal DREQ A. This signal passes through AND 662 which is further enabled at this time by READ and $\overline{DISABLE\ BREQ}$. The output of AND 662 passes through NOR 664 and inverter 668 to the bus request flip-flop 660. At the first $\phi$3A after the first DREQ A is generated, flip-flop 660 is set thereby driving the signal $\overline{BUS\ REQUEST}$ to the low level.

The signal $\overline{BUS\ REQUEST}$ is sent to the bus manager to inform it that the SDMA requires the use of the bus for the purpose of addressing the memory. $\overline{BUS\ REQUEST}$ is actually applied to a priority encoder in the bus manager to generate a $\overline{BUS\ GRANT}$, in essentially the same manner as that signal is generated in the aforementioned copending application. When the bus manager determines that the SDMA may be granted priority it sends back the signal $\overline{BUS\ GRANT}$. $\overline{BUS\ GRANT}$ enables decoder 346 and the decoder produces the signal $\overline{ENABLE\ DATA\ ADR}$.

In FIG. 8, $\overline{ENABLE\ DATA\ ADR}$ passes through NAND 844 to generate the signal MEM OP. MEM OP is passed through inverter 846 to generate the signal $\overline{BUS\ BUSY}$ which is sent back to the bus manager and allows the SDMA to take control of the system bus for one memory cycle or 940 nanoseconds.

$\overline{BUS\ GRANT}$ places the contents of the address pointer counter on the system address bus for the purpose of addressing the memory. $\overline{BUS\ GRANT}$ is applied to the strobe inputs of MUX's 332 and 334 and the enabling inputs of drivers 342 and 344. In addition, when $\overline{BUS\ GRANT}$ enables decoder 346 the decoder produces an output signal to enable drivers 340.

At the same time the address is placed on the system address bus, the control signals $\overline{MEM\ START}$ and $\overline{WRITE}$ are sent to the memory over the system control bus from drivers 340. MEM OP conditions one driver 340 to generate the low level signal $\overline{MEM\ START}$. In FIG. 6, the signal D WRITE A is at the low level and blocks AND 666, hence the signal $\overline{BUS\ REQ\ WRITE}$ is at the low level. This signal is applied to a driver 340, hence the signal $\overline{WRITE}$ is at the high level.

The memory responds to $\overline{MEM\ START}$ and the high level signal $\overline{WRITE}$ by performing a read operation for the purpose of reading out the byte of data stored at the address specified by the address pointer counter. After the data byte has been placed on the system data bus by the memory, the memory generates the low level signal $\overline{MEM\ ACK}$. In FIG. 8, $\overline{MEM\ ACK}$ drives a 3-state driver 828 to produce the signal MEM ACK. MEM ACK is applied to flip-flop 842 and at the next $\phi$1A the output of inverter 821 sets the flip-flop thereby blocking NAND 844 and terminating the signals MEM OP and $\overline{BUS\ BUSY}$.

Back at the time the bus manager generated the signal $\overline{BUS\ GRANT}$, this signal acted through the drivers 830 to produce the high level signal BUS GRANTED and the low level signal $\overline{BUS\ GRANTED}$. $\overline{BUS\ GRANTED}$ resets the bus request flip-flop 660. The BUS GRANTED signal and the READ signal have both enabled AND 826 throughout the memory cycle. At the same time the signal MEM ACK is generated to set flip-flop 842, it passes through AND 826 and NOR 618 to generated $\overline{LOAD\ DATA\ REG}$. This clocks the byte of data that has been read out of the memory from the system data bus into the latches in data register multiplexers 300 and 301. Since the signal DRIVE SDC BUS is at the high level throughout the data transfer operation, the byte of data immediately passes through the data register, through MUX's 302 and 303, and through gates 311 to the SDC bus.

In addition to generating the signal $\overline{LOAD\ DATA\ REG}$, AND 826 produces the signal LOAD READ DATA that is applied through inverter 838 to set flip-flop 816 thereby indicating that the data register has been loaded.

The set output of flip-flop 816 produces the high level signal DR LD FF which is applied to flip-flop 752 so that flip-flop 752 is set immediately upon the setting of flip-flop 816. With flip-flop 752 set, the high level signal DISABLE BREQ enables AND 306 which in turn blocks NAND 310 to insure a low level signal is applied to MUX's 302 and 303 to gate the contents of the data register through MUX's 302 and 303 to the gates 311. The gates 311 are conditioned throughout the data transfer operation by the signal DRIVE DC BUS, hence the data from the data register is placed on the SDC data bus.

When flip-flop 752 is set, the low level signal $\overline{DISABLE\ BREQ}$ blocks AND 662 and terminates the high level input to flip-flop 660.

On the first φ3A after the data register is loaded and flip-flop 752 is set, the output of flip-flop 752 sets flip-flop 750. When flip-flop 750 is set its output drives a driver 706 to place the low level signal $\overline{DACK}$ on the SDC control bus. This signal tells the SDC that a byte of data is available on the SDC data bus and should now be strobed into the SDC buffer register. When the SDC accepts the byte of data the SDC then terminates the signal $\overline{DREQ}$ and the signal DREQ A drops to the low level. In FIG. 7, DREQ A resets flip-flops 750 and 752. In FIG. 6, it blocks AND 662. This prevents generation of another BUS REQUEST until the SDC signals that it wants to make another request by again generating the signal $\overline{DREQ}$.

One memory cycle (940 n.s.) after it was initiated, the signal $\overline{BUS\ GRANT}$ is terminated by the bus manager. In FIG. 3, $\overline{BUS\ GRANT}$ blocks the drivers and multiplexers through which the contents of the address pointer counter are applied to the system address bus. In FIG. 8, the signal BUS GRANTED drops to the low level and the signal $\overline{BUS\ GRANTED}$ rises to the high level when $\overline{BUS\ GRANT}$ is terminated. $\overline{BUS\ GRANTED}$ resets flip-flop 842 and as the flip-flop is reset the positive-going signal $\overline{END\ MEM\ OP\ FF}$ is applid to the low order counter 320 of the address pointer counter thus incrementing the address in the counter by one. The counter is now ready to address the next higher memory location when the next data request is made by the SDC.

This completes the transfer of one byte of data from the memory to the SDC. As soon as the SDC is ready for another byte of data, it will again generate the data request signal $\overline{DREQ}$ and another transfer operation like that just described will take place. After 132 transfers like the one just described, the register in the printer will be loaded and, sensing this, the SDC terminates the low level signal $\overline{SACK}$ which has been transmitted back to the SDMA throughout the data transfer operation. When $\overline{SACK}$ is terminated, the low level signal $\overline{D\ SACK}$ generated by inverter 730 is terminated and this terminates the signal $\overline{NAVAIL}$ generated by NOR 544. This will enable NAND 542 so that interrupts may be recognized or input instructions executed without setting the busy flip-flop 422. The SDC may now initiate an interrupt request to tell the CPU that it is ready for printing. After the print cycle of the printer, the SDC will again report its status to the CPU.

INPUT TRANSFERS

Data transfers from an SDC to the memory are initiated in much the same way as output transfers. Each time the SDC has placed a byte of data on the SDC data bus for transfer to the memory it drops the signal $\overline{DREQ}$ to the low level causing inverter 800 to produce the high level output signal DREQ A. Referring to FIG. 12B, at the same time that $\overline{DREQ}$ is generated for the first byte to be transferred, the SDC generates the low level signals $\overline{D\ WRITE}$ and $\overline{SDC\ BUSY}$. Both of these signals remain at the low level throughout the data transfer operation, hence D WRITE A produced by inverter 808 and DC BUSY A produced by inverter 624 are both at the high level. D SACK is at the high level because the SDC was selected during the input instruction of the set up sequence.

When DREQ A rises to the high level, it enables AND 804 which is further enabled by DR LD FF. At the same time, D WRITE A enables one input of AND 812 which is further enabled because the DACK flip-flop 750 is reset. The output of AND 812 conditions AND 804 so that it produces the high level signal LOAD WRITE DATA and, through NOR 618, the low level signa $\overline{LOAD\ DATA\ REG}$.

The signal LOAD WRITE DATA enables flip-flop 816 and at the next φ1A the flip-flop is set. The signal $\overline{LOAD\ DATA\ REG}$ is applied to data register MUX's 300 and 301 and, since the signal $\overline{DRIVE\ SDC\ BUS}$ is at the low level, the data on the SDC data bus is clocked into the data register through the A inputs. Since the signal $\overline{STEP\ ON}$ is at the high level NAND 310 produces an output signal to MUX's 302 and 303 to select the A inputs hence the byte of data in the data register is passed through MUX's 302 and 303 to the 3-state drivers 314.

When the flip-flop 816 is set, the signal DR LD FF is applied to AND 666 and since the signals D WRITE A and $\overline{END\ MEM\ OP\ FF}$ are both at the high level, the AND produces the signal BUS REQ WRITE which is applid to a driver 340. The output of AND 666 also passes through NOR 664 and inverter 668 to condition the bus request flip-flop 660. At the next φ3A the flip-flop is set to produce the signal $\overline{BUS\ REQUEST}$. The bus manager acknowledges the bus request by returning the low level signal $\overline{BUS\ GRANT}$. In FIG. 3, $\overline{BUS\ GRANT}$ strobes the address from the address pointer counter through MUX's 332 and 334 and the 3state drivers 342 and 344 onto the system address bus to address the memory. $\overline{BUS\ GRANT}$ also enables decoder 346 to produce the low level signal $\overline{ENABLE\ DATA\ ADR}$. This latter signal enables drivers 340 and is applied to NAND 844 to generate the high level signal MEM OP and the low level signal $\overline{BUS\ BUSY}$. MEM OP passes through a driver 340 to become the signal $\overline{MEM\ START}$. $\overline{MEM\ START}$ in combination with the low level signal $\overline{WRITE}$ causes the memory to go through a cycle during which it stores the data byte on the data bus at the address specified by the address being read out of the address pointer counter.

The $\overline{BUS\ GRANT}$ signal from the bus manger is applied to drivers 830 to generate the high level signal BUS GRANTED and the low level signal $\overline{BUS\ GRANTED}$. $\overline{BUS\ GRANTED}$ is applied to flip-flop 660 to reset the flip-flop and terminate the bus request. BUS GRANTED is applied to AND 638 which is already enabled because the READ signal is low, so AND 638 drives the signal $\overline{ENABLE\ DATA\ DRV}$ to the low level. In FIG. 3, this latter signal enables drivers 314 to place the byte of data on the system data bus so that it is stored during the memory cycle.

Back at the time the flip-flop 816 was set to signify that the byte of data on the SDC data bus had been stored in the data register, an acknowledgement was sent back to the SDC so that it may prepare the next byte of data for transfer. When flip-flop 816 is set the signal DR LD FF immediately sets flip-flop 752 and at the next following φ3A the output of flip-flop 752 sets the data acknowledge flip-flop 750. The output of the DACK flip-flop passes through drivers 706 and over the SDC control bus as the signal $\overline{DACK}$ to inform the SDC it may place another byte of data on the SDC data bus. In response to the $\overline{DACK}$ the SDC terminates its DREQ and DREQ A resets flip-flop 750 and 752. However, while flip-flop 750 is set $\overline{DACK\ FF}$ is at the low level and, in FIG. 8, blocks AND's 812 and 804 thereby terminating the LOAD WRITE DATA and $\overline{LOAD\ DATA\ REG}$ signals.

After the memory has accepted the byte of data on the system data bus, it generates $\overline{\text{MEM ACK}}$ which passes through driver 828 and conditions END MEM OP FF 842 so that the flip-flop is set on the next $\phi$1A. This signifies that the memory operation is completed. The output of the flip-flop blocks NAND 844 thereby terminating MEM OP and $\overline{\text{BUS BUSY}}$. At the same time, END MEM OP FF resets flip-flop 816 through AND 814. END MEM PP FF increments the address in the address pointer counters 320-323 to obtain the memory address of the next byte to be transferred.

As soon as the SDC receives the signal $\overline{\text{DACK}}$ it terminates its data request to the SDMA and goes through the operations necessary for it to place another byte of data on the SDC data bus. As soon as it has placed this next byte of data on the bus it again drops the signal $\overline{\text{DREQ}}$ to the low level to initiate another cycle to transfer another byte of data to the memory. This sequence of operations continues until the SDC determines it has transferred all the bytes it has available for transfer. After the data transfer is completed the SDC may request an interrupt through the SDMA to report its status to the CPU.

INTERRUPT SEQUENCE

At the conclusion of a data transfer operation either to or from the memory, an SDC generates an interrupt request for the purpose of telling the SDMA that it is free to go on to another operation, and for the purpose of informing the CPU of the status of the SDC. In addition, SDC's may request interrupts at other times for the purpose of reporting various status conditions.

The SDC control bus has a leading extending through it from each SDC to an input of the priority encoder 526. For purposes of illustration assume that the SDC having the device address 3 has just completed a data transfer operation and desires to free its SDMA and report its status to the CPU. In FIG. 5, the SDC generates the low level signal $\overline{\text{INTREQ 3}}$ which is encoded by the priority encoder 526 to produce two high level signals that are applied to flip-flops 534 and 536. The priority encoder also produces an output signal that passes through inverter 546 to enable NAND 542. At the next following $\phi$3A NAND 542 produces an output signal to set the interrupt sequence enable flip-flop 532. The output of this flip-flop clocks the value 11 into the address latch flip-flops 534 and 536. The output of flip-flop 534 is the signal IDN 1 and it is applied to MUX 406 and MUX 332. The output of flip-flop 536 is the signal IDN 0 and it is applied to AND 462 and MUX 332. When flip-flop 532 is set the low level signal $\overline{\text{INT SEQ EN FF}}$ is applied to MUX's 332 and 334 and selects the A inputs of these MUX's for connection to the system address bus when a $\overline{\text{BUS GRANT}}$ occurs. In FIG. 4, the high level signal INT SEQ EN FF enables NAND 462 to pass the IDN 0 signal, enables the B1 input to MUX 406, and places a high level signal on the select input of MUX 406. This causes the addressing bits 00111 to be placed on the SDC address bus lines $\overline{\text{RSL 4}}$–$\overline{\text{RSL 0}}$. At the same time, INT SEQ EN FF passes through NAND 656 and NOR 654 to generate $\overline{\text{PIN}}$.

At the first $\phi$2A after the interrupt sequence enable flip-flop 532 is set, the signal INT SEQ EN FF passes through MUX 524 and sets the flip-flop 528. The set condition of flip-flop 528 and the reset condition of flip-flop 530 is decoded by decoder 538 to produce the low level signal $\overline{\text{IST 1}}$. At the same time, the decoder terminates signal $\overline{\text{IST 0}}$ and this blocks the enabling input of the priority encoder 526 so that no further interrupts may be recognized while the present interrupt is being processed. In FIG. 7, $\overline{\text{IST 1}}$ passes through NOR 718 to enable flip-flop 720 and at $\phi$3A the flip-flop is set to produce the signal $\overline{\text{SALT}}$. This signal is sent back to the SDC to inform it that an address is on the SDC address bus and ready for the SDC to sample it. This address is the address of the interrupting device and its purpose is to simulate a selection of the interrupting device in much the same manner as occurs during the input instruction of a set up sequence. The only difference is that in this address $\overline{\text{RSL 2}}$ indicates to the SDC that this is an interrupt sequence rather than a selection sequence.

After the SDC samples the address on the SDC address bus it responds with a $\overline{\text{SACK}}$ signal. In FIG. 4 $\overline{\text{SACK}}$ is inverted to 724 to generate D SACK. In FIG. 5, D SACK passes through MUX 524 to reset flip-flop 528 and set flip-flop 530. The outputs from the flip-flops cause decoder 538 to terminate the signal $\overline{\text{IST 1}}$ and initiate the low level signal $\overline{\text{IST 2}}$ and the high level signal IST 2. In FIG. 7, when $\overline{\text{IST 1}}$ is terminated the SALT flip-flop 720 is immediately reset by the output of NOR 718.

$\overline{\text{IST 2}}$ passes through NOR 738 and enables flip-flop 740 so that the flip-flop is set at the next $\phi$3A. Flip-flop 740 produces the $\overline{\text{FALT}}$ signal through driver 706 and this signal is sent back to the SDC to ask it to supply the interrupt status. When the SDC recognizes $\overline{\text{FALT}}$ it places the interrupt status on the SDC data bus and responds with a $\overline{\text{FACK}}$ signal.

In FIG. 6 $\overline{\text{FACK}}$ is inverted at 600 to become D FACK which enables one input of AND 604. Since $\overline{\text{IST 2}}$ is at the low level the output of NOR 608 further conditions AND 604 and the output the AND passes through NOR 618 to generate $\overline{\text{LOAD DATA REG}}$. The signal $\overline{\text{DRIVE SDC BUS}}$ is at the low level at this time hence the status byte is loaded into the data register MUX's 300 and 301. $\overline{\text{STEP ON}}$ is disabling NAND 310 so the contents of the data register are gated through MUX's 302 and 303 to drivers 314.

D FACK is also applied to AND 606 and in combination with IST 2 generates the signal INT REQ which is applied to decoder 346 thereby selecting terminal 2 as the output terminal of the decoder. The INT REQ signal also enables flip-flop 658 and at the next $\phi$3A the flip-flop is set to produce the signal INT REQ FF. This signal is passed through driver 828 and onto the system control bus as the signal $\overline{\text{INT REQ}}$.

After some indeterminate time the CPU will determine that it can now process the interrupt and at this time the CPU generates a BUS GRANT as fully explained in the abovementioned copending application.

In FIG. 3, $\overline{\text{BUS GRANT}}$ strobes onto the system address bus an address correspondig to the signals applied to the A inputs of MUX's 332 and 334. In addition, $\overline{\text{BUS GRANT}}$ enables decoder 346 and it produces an output to enable drivers 350 to place on the system data bus two bits of the three bit address identifying the SDMA. There is thus placed on the system address bus the address 10100011 where the two low order bits identify the interrupting SDC and the three high order bits identify its SDMA.

In FIG. 8, $\overline{\text{BUS GRANT}}$ passes through drivers 830 to generate the high level signal BUS GRANTED and the low level signal $\overline{\text{BUS GRANTED}}$. In FIG. 6, BUS GRANTED enables AND 638 and since $\overline{\text{INT SEQ EN}}$ FF is at the low level the output of NOR 636 further enables AND 638 so that NOR 632 produces the low level signal ENABLE DATA DRV. In FIG. 3, this latter signal enables drivers 314 to place on the system data bus the output signals from MUX's 302 and 303. Since the output signal from NAND 310 is low at this time this output corresponds to the content of the data register and is the status being reported by the interrupting SDC.

In FIG. 5, BUS GRANTED is applied to MUX's 522 and 524 and is clocked through the MUX's at the next φ2A. The output of MUX 522 immediately resets the interrupt sequence enable flip-flop 532 and the output of MUX 524 advances the count in flip-flops 528 and 530 to a count of three.

With both flip-flops 528 and 530 set, the outputs condition decoder 538 to terminate IST 2. The decoder produces an output at its number 3 output terminal but this signal is not used.

When IST 2 is terminated, the flip-flop 740 is immediately reset by the output of NOR 738 and the signal FALT is terminated. In response to this the SDC terminates the signal FACK.

The address placed on the system address bus and the status placed on the system data bus are entered into two hardware registers (not shown) in the bus manager 104. The bus manager interrupts the CPU as explained in the aforementioned copending application. After the CPU processes the status, it may then initiate another operation of the SDC by first generating an input instruction and then a sequence of three output instructions. It will be understood that the final output instruction need not specify a data transfer operation as described above, but may designate a particular function of the device connected to the addressed SDC, such as selecting print or punch, or designating a hopper, if the peripheral device attached to the SDC is a data recorder.

REPORTING STATUS DURING INPUT INSTRUCTION

The set-up sequence of one input and three output instructions described above assumed that the SDMA was not busy and the SDC specified by the input instruction address did exist. If either of these conditions is not true, the status is reported to the CPU and the output instructions may not follow.

If the SDMA is busy at the time it recognizes its address and generates START PULSE, then the input instruction sequence described above is modified. If the data register of the SDMA is loaded then the flip-flop 816 is set to indicate this fact and the signal DR LD FF will be at a low level to indicate that the SDMA is busy. In like manner, if any SDC connected to the SDMA is producing a low level signal SACK indicating that it is communicating with the SDMA, the signal D SACK in FIG. 7 at the low level. Both DR LD FF and D SACK are applied to NOR 544 to generate the signal NAVAIL. NAVAIL is applied to NOR 438 which receives the low level signal INT SEQ EN FF. This latter signal is at the low level any time an interrupt sequence is being performed by the SDMA. Therefore, if the SDMA is busy NOR 438 produces an output signal to enable the busy flip-flop 422. When START PULSE is generated to set the GO flip-flop 424, it also passes through inverter 436 and sets busy flip-flop 422 thereby enabling one input of NAND 442. The SELECTION signal will be at a high level as previously described so NAND 442 produces an output signal that passes through NOR 448 to drive the signal STEP ON to the high level. In FIG. 5, STEP ON enables the A2 input of MUX 506 and the signal from the GO flipflop passes through the D4 input of MUX 506 to the counter 510. This advances the counter to the count of one and decoder 514 produces SST 1. However, the signal STEP ON is at the lower level and blocks NAND 716 so that SALT is not generated by flip-flop 720 during SST 1.

With counter 510 containing a count of one the STEP ON signal applied to the D5 input of MUX 506 passes through the MUX to the counter and at the next φ2A SST 1 is terminated and SST 2 begins. Normally FALT would be generated during SST 2. However, this is not necessary since the SDC is otherwise busy so the low level signal STEP ON blocks NAND 736 and prevents the setting of the function alert flip-flop 740.

The combination of a count of two in counter 510 and the high level STEP ON signal selects the D6 input of MUX 506. In FIG. 3, the signal DISABLE DREQ is at the low level so inverter 308 produces the high level signal STEP ENABLE that is applied through the D6 input of MUX 506 to the counter 510. At the next φ2A the counter is advanced to a count of three thereby causing the decoder 514 to terminate SST 2 and begin SST 3. In FIG. 4, SST 3 resents the GO flip-flop 424 thereby terminating NOT READY. This enables the CPU to resume execution of the input instruction. The CPU then terminates the signal DATA BUS IN and the output of NOR 504 rises to the high level. The output of NOR 504 passes through MUX 506 to the counter 510 and at the next φ2A the counter is incremented again to return it to a count of zero. This terminates the SST 3 output from decoder 514. The busy flip-flop 422 is reset when the signal INPUT terminates thereby driving the signal I/O RD or WR to the low level.

The reset output of flip-flop 422 is connected to the D3 input of MUX 303 as previously explained in connection with FIG. 3 for the purpose of generating the busy status value 80. All inputs to NAND 310 are at the low level so the output of the NAND selects the B inputs of MUX's 302 and 303 for application to the 3-state drivers 314. During SST 3 AND 630 is enabled so NOR 632 produces the low level signal ENABLE DATA DRV and this signal enables the drivers 314 to gate the busy status onto the data bus. From the data bus it is returned to the accumulator in the CPU. After the status is analyzed by the CPU, it then determines what action to take.

If the addressed SDC is non-existent, the input instruction sequence also varies from the normal sequence. In this case the sequence takes place in the normal manner until SST 1 when NAND 716 produces an output signal to set flip-flop 720 and generate SALT. The output of NAND 716 is the signal EN SALT X which is applied to the K input, and through inverter 460 to the J input of flip-flop 446. Now, if the addressed SDC does exist, it normally responds to SALT with SACK before the next φ1A and SACK is inverted at 724 to become D SACK which is applied through NOR 444 to hold flip-flop 446 reset. If the addressed SDC is non-existent then it cannot generate SACK and there will be no reset signal applied to the flip-flop 446. In this case the flip-flop is set at the first φ1A following generation of SALT. The output of flip-flop 446 passes through NOR 448 to generate STEP ON. STEP ON immediately resets flip-flop 720 thereby terminating SALT, and further prevents the setting of flip-flop 740 which generates FALT.

STEP ON enables NAND 310 because SDMA PROBE is at the low level to enable a second input of NAND 310 and DISABLE BREQ is at the low level to block NAND 306. The output of NAND 306 generates the high level signal ENABLE STEP and NAND 310 applies a high level signal to the select input of MUX's 302 and 303 thereby selecting the B inputs. All of these B inputs are tied to +V except the B3 input of MUX 303 which is receiving the high level signal BUSY. Therefore, all outputs from MUX's 302 and 303 are at the logic zero level and these outputs are applied to the drivers 314.

In FIG. 5, the STEP ON signal passes through the D5 input of MUX 506 and at the next $\phi$2A advances counter 510 to a count of two. This terminates SST 1 and begins SST 2.

Nothing happens during SST 2 which is the time that the status would normally be loaded into the data register. Since the addressed SDC is non-existent it cannot provide the signal D FACK to enable AND 604 and load the data register.

With the count of two in counter 510 and the signal STEP ON at the high level the signal ENABLE STEP is gated through MUX 506 to the counter 510. At the next $\phi$2A the count is advanced to a counter of three, decoder 514 terminates SST 2, and SST 3 begins.

During SST 3 AND 630 is enabled and NOR 632 produces the low level signal ENABLE DATA DRV which is applied to the enabling inputs of drivers 314 thereby gating the status byte 00 onto the data bus. SST 3 resets the GO flip-flop 424 and terminates the signal NOT READY thereby permitting the CPU to resume execution of the input instruction. Subsequently, the signal DATA BUS IN terminates and a high level output from NOR 504 passes through MUX 506 to enable counter 510. At the next $\phi$2A the counter advances to the zero state thereby terminating SST 3 at the output of decoder 514. This concludes the generation of the status byte for a non-existent SDC. As before, the status byte is sent back to the CPU accumulator for analysis.

In summary, the present invention provides means whereby a plurality of SDC's controlling peripheral devices having diverse characteristics may have direct access to a memory even though the controlling central processor unit has only two instructions for controlling the set up of data transfers between the memory and the SDC's. These two instructions are INPUT and OUTPUT. The INPUT instruction is utilized in the manner of START I/O instructions of the prior art used to address an SDC and to obtain the status of the addressed SDC. The OUTPUT instruction is then utilized three times, twice to load an address pointer counter in a shared direct memory access controller, and once to send a command to the SDC that was addressed by the INPUT instruction. The SDMA services a plurality of SDC's and includes no device dependent logic, i.e., no logic specific to any one type of SDC or peripheral device controlled thereby. The SDMA includes only circuitry which would otherwise have to be duplicated in each of the SDC's.

While a preferred embodiment of the invention has been described in specific detail, it will be understood that various modifications and substitutions may be made without departing from the spirit and scope of the invention as defined by the appended claims.

I claim:

1. In a data processing system having a common address bus and a common data bus interconnecting a central processor and a memory, and a plurality of peripheral devices, the improvement comprising:
   an addressable direct memory access unit connected to said common address and data buses for controlling the direct transfer of data between said peripheral devices and said memory, a plurality of addressable subsystem device controllers connected between said direct memory access controller and the peripheral devices controlled by said direct memory access controller, a common subsystem device controllers to said direct memory access controller;
   address recognition means in said shared direct memory access controller for recognizing some of the address bits on said common address bus as the address of said shared direct memory access controller;
   gating means responsive to said address recognition means and an INPUT instruction from said central processor for gating address bits on said common address bus onto said common subsystem bus as the address of a status register in a selected on of said subsystem device controllers;
   said selected subsystem device controller including a status register and means returning the value in its status register to said shared direct memory access controller over said common subsystem bus;
   a register in said direct memory access controller for receiving and storing said value; and,
   means transferring said value to said central processor from said register over said common data bus, whereby said INPUT instruction functions both to start a device controller and cause its status to be transferred to said central processor.

2. The improvement as claimed in claim 1 wherein said central processor has an instruction repertoire including only an INPUT and an OUTPUT instruction for addressing said direct memory access units.

3. The improvement as claimed in claim 1 and further comprising:
   a counter in said shared direct memory access controller;
   a selection means responsive to said address recognition means and an output instruction from said central processor for loading a value on said common data bus into said counter; and,
   gating means connecting said counter to said common address bus so that the contents of said counter may directly address said memory.

4. The improvement as claimed in claim 3 and further comprising:
   means responsive to said address recognition means and other bits of an address on said common address bus for transferring data on said common data bus to a subsystem device controller.

5. The combination comprising:
   a central processor producing only an input or an output instruction for communicating with subsystem device controllers;
   a memory;
   a status receiving means;
   a plurality of subsystem device controllers each having register means including a status register addressable by addresses on a subsystem bus;
   a system address bus and a system data bus connected to said central processor and said memory;

a subsystem bus connected to said subsystem device controllers; and, a shared direct memory access controller connected to said subsystem bus and said system address and data buses for controlling the transfer of data between said memory and said subsystem device controllers, said direct memory access controller comprising:

first gating means connected to said system data bus and said subsystem bus for selectively gating data in either direction between said system data bus and said subsystem bus;

second gating means connected to said system address bus and said subsystem bus for selectively gating addresses from said system address bus to said subsystem bus; and, means responsive to an input instruction and a first address on said system address bus for controlling said first and second gating means to thereby place the status of a selected one of said subsystem device controllers on said system data bus for transfer to said status receiving means.

6. The combination as claimed in claim 5 wherein said shared direct memory access controller further includes:

a counter; and, means responsive to output instructions and predetermined addresses on said system address bus for loading said counter with data on said system data bus, said counter having its outputs connected to said system address bus for addressing said memory.

7. The combination as claimed in claim 6 wherein said shared direct memory access controller includes means responsive to an output instruction and a predetermined address on said system address bus for controlling a predetermined sybsystem device controller to initiate a transfer of data between said predetermined subsystem device controller and said memory.

8. The combination as claimed in claim 7 wherein each of said subsystem device controllers includes an address recognition means for recognizing its own address placed on said subsystem bus during said input instruction, said predetermined subsystem device controller being the one whose address appears on said subsystem bus during said input instruction.

9. A microprocessor system comprising:

a microprocessor having means therein for producing a first output signal representing an INPUT instruction and a second output signal representing an OUTPUT instruction;

a memory;

an addressable direct memory access controler;

a system bus connected to said microprocessor, said memory and said memory access controller;

a plurality of peripheral devices;

a plurality of subsystem device controllers each associated with and controlling one of said plurality of peripheral devices, said subsystem device controllers being connected to said direct memory access controller for the transfer of control signals and data bytes therebetween;

said subsystem device controllers each including a status register and means for returning the value in its status register to said addressable direct memory access controller;

said direct memory access controller including first means responsive to an INPUT instruction and an address on said system bus for selecting one of the subsystem device controllers and its associated peripheral device, and second means responsive to said status register value for inhibiting operation of said first means if the direct memory access controller or a subsystem device controller connected thereto is busy.

10. A microprocessor system as claimed in claim 9 wherein said address includes a first address portion representing the address of said direct memory access controller, and a second address portion representing the address of subsystem device controller to be selected, said direct memory access controller including means responsive to said first address portion for applying said second address portion to all said subsystem device controllers.

11. A microprocessor system as claimed in claim 9 and further comprising: a status receiving means; and, means in said direct memory access controller responsive to the selected subsystem device controller for placing the status of the selected peripheral device on said system bus for transfer to said status receiving means.

12. A microprocessor system as claimed in claim 11 and further comprising:

an addressable counter within said shared direct memory access controller;

means responsive to an OUTPUT instruction for loading a pointer address into said counter;

means connecting said counter to said system bus for addressing a memory location whereby data bytes in said memory may be transferred to the selected sybsystem device controller on data bytes may be transferred from the selected subsystem device controller to said memory; and, means incrementing said counter after each data byte has been transferred.

13. A microprocessing system as claimed in claim 12 and further comprising:

means in said shared direct memory access controller responsive to a further OUTPUT instruction and a predetermined combination of bits on said system bus for transferring a control byte from said system bus to the selected subsystem device controller to thereby control the operation to be performed by said selected subsystem device controller and its associated peripheral device.

14. A shared direct memory access controller for use in a system having a system address bus and a system data bus connected to a processor means, a memory and a plurality of direct memory access controllers, each said direct memory access controller controlling a plurality of subsystem device controllers and comprising:

interrupt priority encoder means responsive to interrupt signals from subsystem device controllers connected to said shared direct memory access controller, said interrupt priority encoder means including means for producing a multibit value representing the address of the subsystem device controller granted priority to the direct memory access controller, register means receiving data from said subsystem device controller for applying said data to said system data bus;

means responsive to said interrupt priority encoder means for addressing the subsystem device controller granted priority to load the status of said subsystem device controller into said register means;

means for generating an interrupt request signal requesting access to said system address bus and system data bus in response to the loading of said register means;
means responsive to said interrupt request signal for generating the address of said shared direct memory access controller and transmitting it to said system address bus; and
status receiving means for receiving said shared direct memory access controller address and said status of said subsystem device controller.

15. A shared direct memory access controller as claimed in claim 14 in combination with data processor means responsive to said interrupt request signal for generating a bus grant signal, said shared direct memory access controller including means responsive to said bus signal for gating said subsystem device controller address and said shared direct memory access controller address onto said system address bus while gating the subsystem device controller status from said register means onto said system data bus.

* * * * *

UNITED STATES PATENT AND TRADEMARK OFFICE
CERTIFICATE OF CORRECTION

PATENT NO. : 4,067,059

DATED : January 3, 1978

INVENTOR(S) : Nicholas Derchak

It is certified that error appears in the above-identified patent and that said Letters Patent are hereby corrected as shown below:

Claim 1, line 5, after "addressable" insert --shared--.
Claim 1, line 5, change "unit" to --controller--.
Claim 1, line 13, before "device" insert --bus connecting said subsystem--.
Claim 2, line 4, change "units" to --controller--.
Claim 7, line 5, change "sybsystem" to --subsystem--.
Claim 9, line 7, change "controler" to --controller--.

Signed and Sealed this

Fifteenth Day of July 1980

[SEAL]

Attest:

SIDNEY A. DIAMOND

Attesting Officer  Commissioner of Patents and Trademarks